United States Patent
Tsuchida et al.

(10) Patent No.: US 7,003,371 B2
(45) Date of Patent: Feb. 21, 2006

(54) APPARATUS FOR PROCESSING ELECTRONIC DRAWING DATA

(75) Inventors: Koichi Tsuchida, Isehara (JP); Yoshiyuki Matsui, Isehara (JP); Yukio Fukui, Isehara (JP); Toshio Takagi, Isehara (JP)

(73) Assignee: Amada Company Limited, Kanagawa (JP)

(*) Notice: Subject to any disclaimer, the term of this patent is extended or adjusted under 35 U.S.C. 154(b) by 0 days.

(21) Appl. No.: 10/344,010

(22) PCT Filed: Aug. 16, 2001

(86) PCT No.: PCT/JP01/07055

§ 371 (c)(1),
(2), (4) Date: Feb. 14, 2003

(87) PCT Pub. No.: WO02/17148

PCT Pub. Date: Feb. 28, 2002

(65) Prior Publication Data

US 2003/0177024 A1 Sep. 18, 2003

(30) Foreign Application Priority Data

Aug. 18, 2000 (JP) .............................. 2000-248907

(51) Int. Cl.
G06F 19/00 (2006.01)
G06F 15/16 (2006.01)
G06F 17/60 (2006.01)

(52) U.S. Cl. .................. 700/182; 700/96; 700/97; 715/964; 709/200; 705/28

(58) Field of Classification Search ............... 700/96, 700/97, 98, 180–182; 345/964; 709/200; 715/964

See application file for complete search history.

(56) References Cited

U.S. PATENT DOCUMENTS

| 5,570,292 A | * | 10/1996 | Abraham et al. ........... 707/157 |
| 5,630,041 A | * | 5/1997 | Mills et al. ................. 345/441 |
| 5,646,862 A | * | 7/1997 | Jolliffe et al. ................... 703/1 |
| 5,796,986 A | * | 8/1998 | Fuller ............................. 716/1 |
| 5,815,683 A | * | 9/1998 | Vogler ......................... 395/500 |
| 5,864,482 A | * | 1/1999 | Hazama et al. ......... 364/468.01 |
| 6,057,929 A | * | 5/2000 | Walker ....................... 358/1.15 |
| 6,243,611 B1 | * | 6/2001 | Hazama et al. ............... 700/97 |
| 6,295,513 B1 | * | 9/2001 | Thackston ..................... 703/1 |

(Continued)

FOREIGN PATENT DOCUMENTS

JP 10303986 11/1998

(Continued)

OTHER PUBLICATIONS

Kanamori, "A FMS to process elevator sheet metals" 1995, Emerging Technologies and Factory Automation.*

(Continued)

Primary Examiner—Leo Picard
Assistant Examiner—Sean Shechtman
(74) Attorney, Agent, or Firm—Greenblum & Bernstein, P.L.C.

(57) ABSTRACT

Disclosed are an apparatus and a method, which assist CAD data to be usable by supplier's own CAD and automatic programming tool no matter how a format of the CAD data from an orderer may be. Electronic drawing data Dx prepared in an orderer 11 is received in an outsourcing service center 14, the received electronic drawing data Dx is subjected to data conversion into electronic drawing data Dc in a format designated by the supplier 12, and the electronic drawing data Dc having been subjected to the data conversion is transmitted to the supplier 12 or a designated destination.

18 Claims, 29 Drawing Sheets

U.S. PATENT DOCUMENTS

| | | | | |
|---|---|---|---|---|
| 6,301,574 | B1 * | 10/2001 | Thomas et al. | 707/1 |
| 6,647,305 | B1 * | 11/2003 | Bigelow | 700/97 |
| 6,686,914 | B1 * | 2/2004 | Keener | 345/420 |
| 2001/0039615 | A1 * | 11/2001 | Bowker et al. | 713/162 |
| 2002/0035507 | A1 * | 3/2002 | Singh | 705/14 |
| 2002/0069295 | A1 * | 6/2002 | Edwards et al. | 709/246 |
| 2003/0128232 | A1 * | 7/2003 | Tsuji | 345/736 |

FOREIGN PATENT DOCUMENTS

| | | | |
|---|---|---|---|
| JP | 11-110451 | * | 4/1999 |

OTHER PUBLICATIONS

Janowski, "Transferring CAD/CAM Files" Jul. 15th 1999, Gardner Publications, Inc.*

Albert, "STEP NC—The End Of G-Codes?" Jul. 1st 2000, Gardner Publications, Inc.*

Koellsch "The Inernet . . . a versatile metalworking tool" Oct. 1999, Machine Shop Guide Web Archive.*

The American Heritage Dictionary of the English Language 2000, 4th edition, Houghton Muifflin Company.*

English Language Abstract of JP Appln. No. 10-303986.

Network Computing, Kabushiki Kaisha Ric Telecom Hakkou, vol. 12, No. 3, Mar. 2000, pp. 28-36, "Tokushuu B to B Kara Tachiagaru E Business Part 2 Vender, SI, User Community Senku no Site 6sha 6you".

* cited by examiner

FIG.4

Welcome to e-receiving CAD

There are three newly received units.

| RECEIVING RECORD | | | | | PROGRAM S | RESPONSE RECORD | | ACCOUNTING STATUS |
|---|---|---|---|---|---|---|---|---|
| RECEIVED UNIT No. | ORIGIN | TRANSMISSION DATE | PERSON IN CHARGE | SUBJECT NAME | DRAWING NUMBER | COMMENT | ACCOMPANYING DRAWINGS | ORDERER | COMMENT |
| 0014 | TANAKA BANKIN | 2000.7.31 | SUZUKI | LAN FRAME ASSEMBLY | DRAWING | NEW | 1 PIECE | TO○ OME PLANT | URGENT |
| 001○ | SATOH SEIMITSU | 2000.7.31 | HAYASHI | LAN-FRAME BOTTOM | PLATE 256 | NEW | 1 PIECE | HITACHI MITO PLANT | DESIRED TO BE DELIVERE○ |
| | ○USHO | 2000.7.31 | INOUE | | | | 2 PIECES | FUJI ELECTRIC SUZUKA FACTORY | NOT LAT○ |

DETAILS ARE DISPLAYED BY DOUBLE CLICK

SERVICE HISTORY FOR EACH ORDERER

CAD CONVERSION: AP40/60, AP40/60, AP40/60
DEVELOPMENT VIEW PREPARATION
PROGRAM PREPARATION

HISTORY

DOWNLOAD OF FILE

- Lanmannt.dxf
- Lanma256.dxf
- TA-B-LZV36.dxf

FILE WAS SELECTED TO BE DOWNLOADED FROM THIS SITE
PROCESSING METHOD FOR THIS FILE
xxxxx-xxxxxxxxx
PROCESSING METHOD FOR THIS FILE
○ EXECUTE THIS FILE FROM ABOVE SITE (O)
● STORE THIS FILE IN DISK

☐ ALERT IF FILE IS OF THIS TYPE (W)

REPLY

☐ EXECUTE THIS

※DEVELOPMENT LENGTH IS CORRECTED
BY BENDING ELONGATION VALUE
(WHICH IS SUBTRACTED)

| SHEET THICKNESS d (mm) | | 1 | 1.2 | 1.6 | 2 | 2.3 | 3.2 |
|---|---|---|---|---|---|---|---|
| ELONGATION VALUE | COMPANY A | 1.5 | 1.8 | 2.5 | 3 | 3.5 | 5 |
| | COMPANY B | 1.6 | 2 | 2.8 | 3.3 | 3.8 | 5.4 |
| | COMPANY C | 1.7 | 2.2 | 3.1 | 3.6 | 4.2 | 5.8 |

FIG.13
(1)
(2) MACHINING RANGE
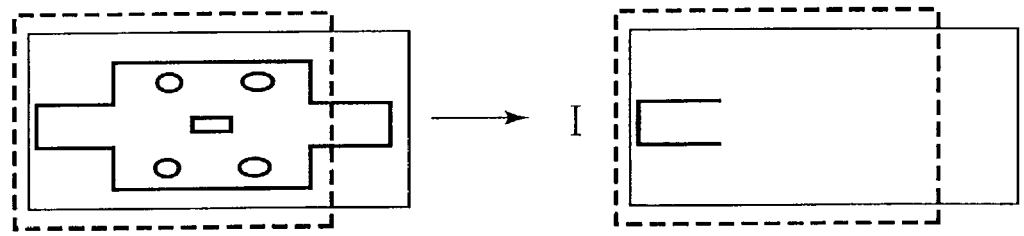
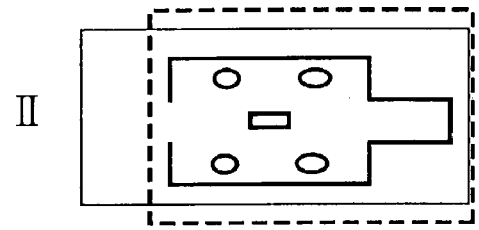
(3)
(EXAMPLE)
TRIMMING ORDER IS DIFFERENT
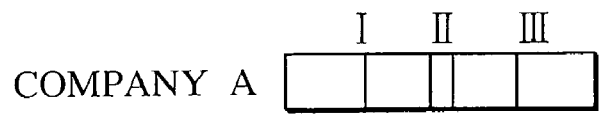
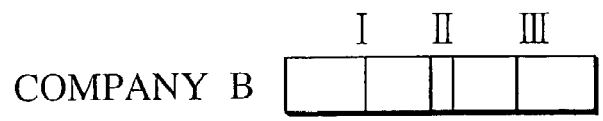

FIG.16
① PRIORITY TO YIELD
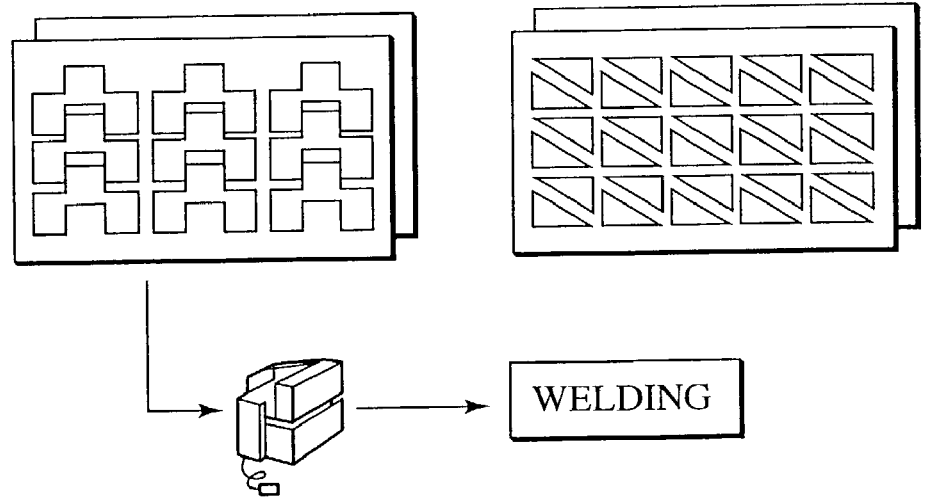
② PRIORITY TO WORK EFFICIENCY
　IN POST-PROCESS
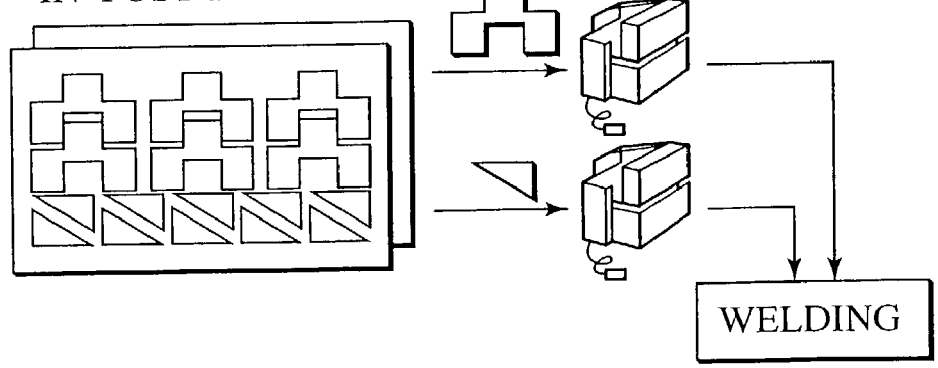

FIG.20

| INPUTS | | | WORK PROCESS | | | | | | OUTPUTS (FRUITS) |
|---|---|---|---|---|---|---|---|---|---|
| CLIENT TO AODA | CONTENTS | | FORMAT CONVERSION | DUST REMOVAL | BREAKING UP OF ASSEMBLY DRAWING | PREPARATION OF DEVELOPMENT VIEW | PREPARATION OF SOLID VIEW | SUMMING UP OF ESTIMATION BASES | 1. BASIC CALCULATION DATA FOR ESTIMATION |
| PAPER DRAWING | PARTS VIEW | | | | | ○ | ○ | ○ | 2. SOLID VIEW (PRODUCT/PARTS) |
| | PRODUCT VIEW | | | | ○ | ○ | ○ | ○ | 3. DEVELOPMENT VIEW (PARTS) |
| AP40/60 DEVELOPMENT VIEW | PARTS VIEW | | | | | | ○ | ○ | 4. THREE VIEW (PRODUCT/PARTS) |
| AP100 DEVELOPMENT VIEW | PARTS VIEW | | | | | | ○ | ○ | 5. AP100-3D MODEL (PRODUCT/PARTS) |
| ELECTRONIC DRAWING (2D-CAD) | PARTS VIEW | | ○(1) | ○ | | ○ | ○ | ○ | 6. EXAMINATION/ ESTIMATION FOR MACHINING METHOD |
| | PRODUCT VIEW | | ○(1) | ○ | ○ | ○ | ○ | ○ | |
| 3D MODEL (3D-CAD) | PARTS VIEW | | ○(2) | ○ | | ○ | ○ | ○ | |
| | PRODUCT VIEW | | ○(2) | ○ | ○ | ○ | ○ | ○ | |

(1) ORDERER'S 2D-CAD FORMAT IS CONVERTED INTO 2D-CAD FORMAT HANDLEABLE BY CAD/CAM SOFTWARE MADE BY OUTSOURCING SERVICE CENTER (EXAMPLE: DXF)

(2) ORDERER'S 3D-CAD FORMAT IS CONVERTED INTO 3D-CAD FORMAT HANDLEABLE BY CAD/CAM SOFTWARE MADE BY OUTSOURCING SERVICE CENTER (EXAMPLE: Parasolid)

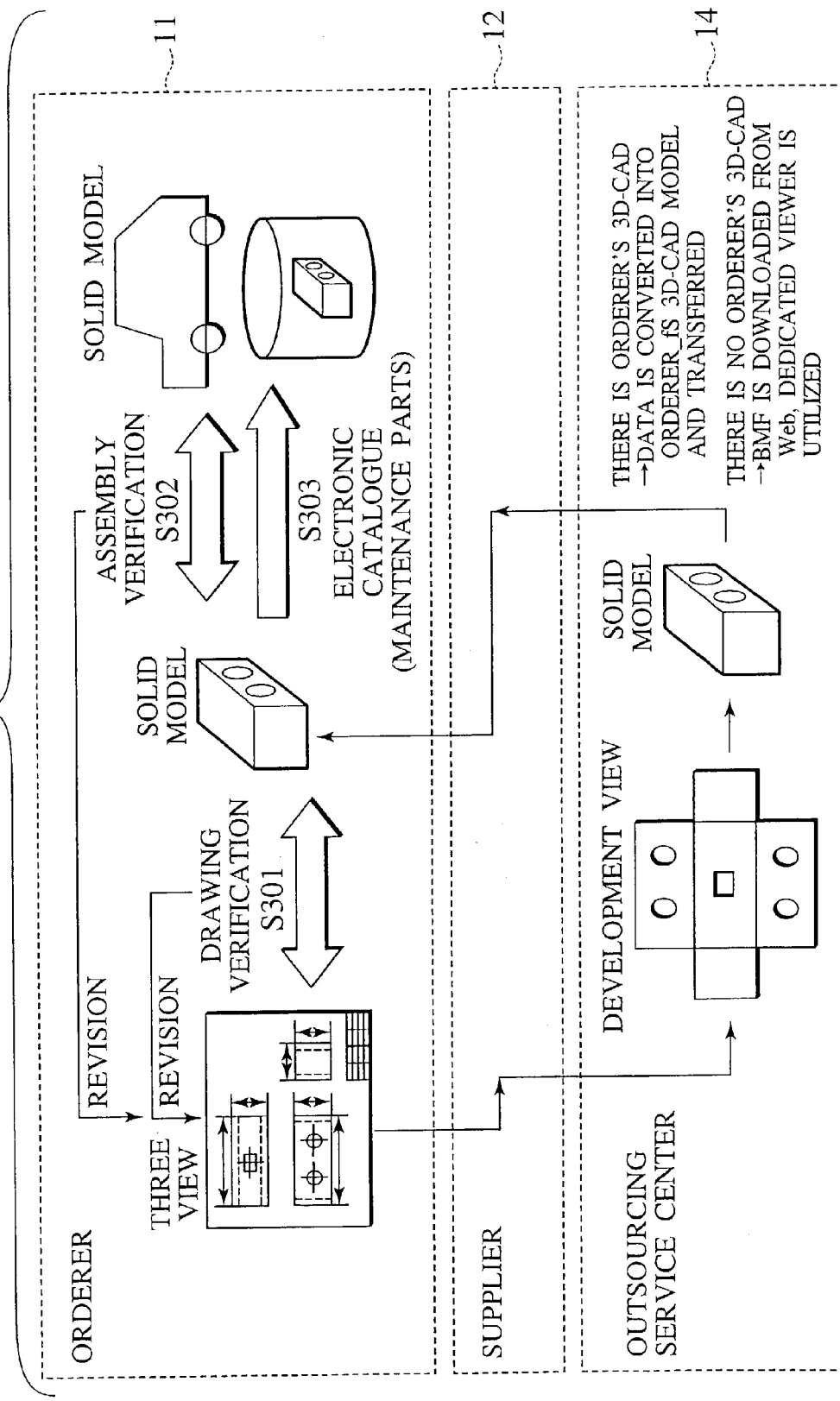

FIG.23

| INPUTS | | WORK PROCESS | | | | | | OUTPUTS (FRUITS) |
|---|---|---|---|---|---|---|---|---|
| CLIENT TO AODA | CONTENTS | FORMAT CONVERSION | DUST REMOVAL | BREAKING UP OF ASSEMBLY DRAWING | PREPARATION OF DEVELOPMENT VIEW | PREPARATION OF SOLID VIEW | SUMMING UP OF ESTIMATION BASES | ① MACHINING PROGRAM<br>・NCT<br>・LASER<br>・COMPOUND MACHINE<br>・TAPPING<br>・BURR REMOVAL<br>・BENDING<br>・WELDING<br>・INSPECTION<br>② SOLID VIEW (PRODUCT/PARTS)<br>③ DEVELOPMENT VIEW (PARTS)<br>④ THREE VIEW (PRODUCT/PARTS)<br>⑤ AP100-3D MODEL (PRODUCT/PARTS)<br>⑥ EXAMINATION/ESTIMATION FOR OPTIMUM MACHINING METHOD<br>⑦ IMAGE CAPTURE VIDEO |
| PAPER DRAWING | PARTS VIEW | / | / | / | ○ | ○ | ○ | |
| PAPER DRAWING | PRODUCT VIEW | / | / | ○ | ○ | ○ | ○ | |
| AP40/60 DEVELOPMENT VIEW | PARTS VIEW | / | / | / | / | ○ | ○ | |
| AP100 DEVELOPMENT VIEW | PARTS VIEW | / | / | / | / | ○ | ○ | |
| ELECTRONIC DRAWING (2D-CAD) | PARTS VIEW | ○(1) | ○ | / | ○ | ○ | ○ | |
| ELECTRONIC DRAWING (2D-CAD) | PRODUCT VIEW | ○(1) | ○ | ○ | ○ | ○ | ○ | |
| 3D MODEL (3D-CAD) | PARTS VIEW | ○(2) | ○ | / | ○ | ○ | ○ | |
| 3D MODEL (3D-CAD) | PRODUCT VIEW | ○(2) | ○ | ○ | ○ | ○ | ○ | |

FIG.27
CORNER RADIUS 927
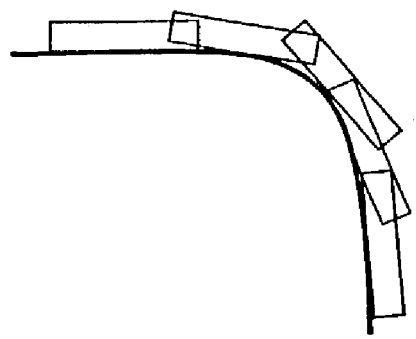
NON-CIRCULAR HOLE 929
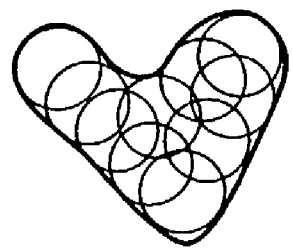
VARIOUS HOLES 931

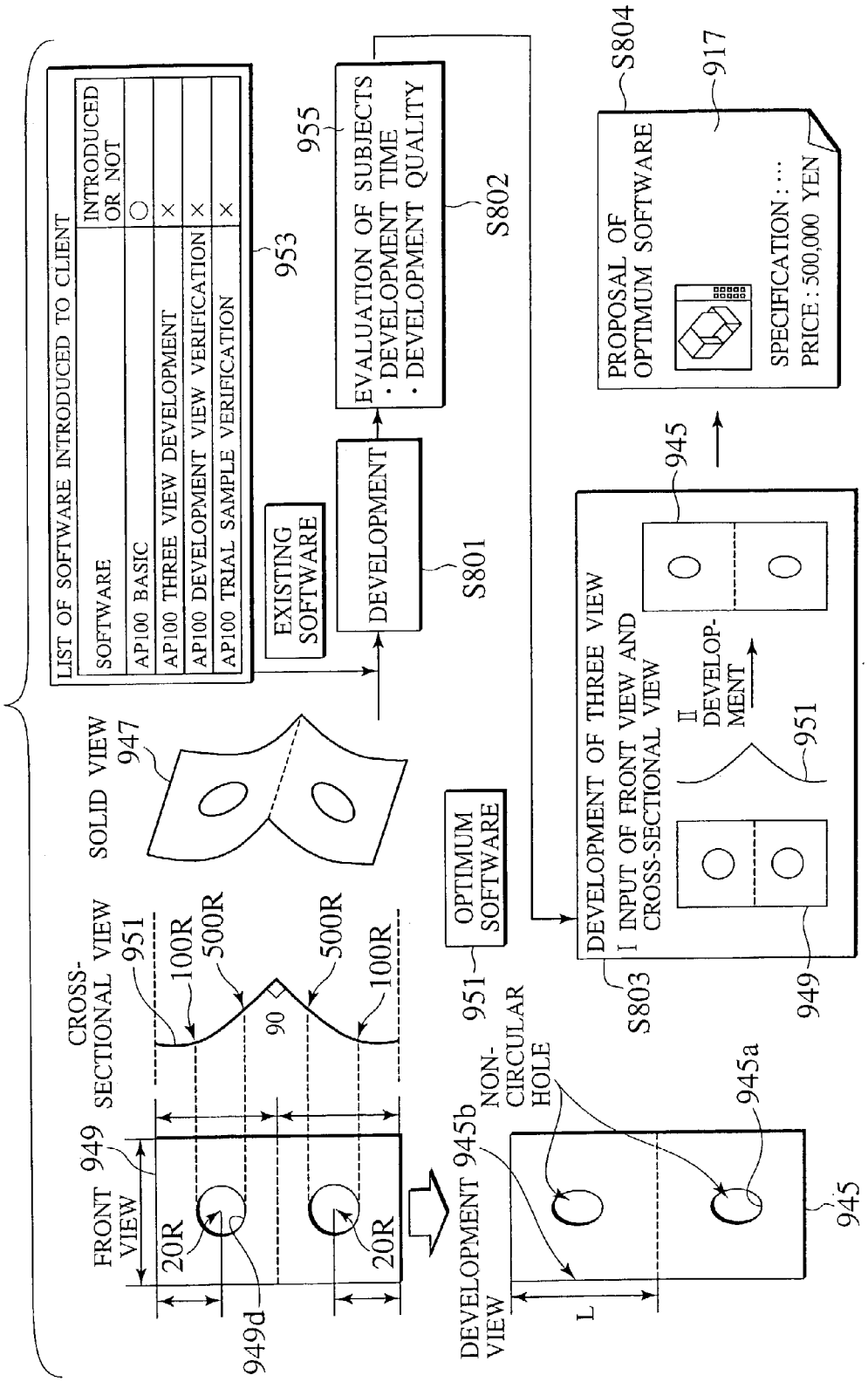

APPARATUS FOR PROCESSING ELECTRONIC DRAWING DATA

BACKGROUND OF THE INVENTION

1. Field of the Invention

The present invention relates to an outsourcing service apparatus regarding electronic drawing data, and more particularly, relates to an outsourcing service apparatus regarding electronic drawing data in a business model in which machining is performed by machine tools in a supplier based on the electronic drawing data prepared in an orderer.

2. Description of the Related Art

Machining of parts by machine tools in a supplier such as a subcontract factory based on electronic drawing data prepared in an orderer such as a parent company in accordance with design specifications thereof and delivery of the machined parts to a place designated by the orderer have been broadly performed in various manufacturing and processing industries.

The electronic drawing data prepared in the orderer is CAD data used by the orderer, and the CAD data (design CAD data) can be transmitted from the computer and server of the orderer to the computer of the supplier by a communication line directly or through a mail server of a provider of the Internet or the like.

Then, improvement of infrastructure for performing such a thing as described above has been progressing domestically and abroad, and it is conceived that placement and receipt of an order by printed-out paper drawings are going to be reduced.

However, the manufacturing and processing industries, and particularly, most of the subcontract factories (suppliers) performing sheet metal machining such as press machining are middle and small-scale in a size of cottage industries. Even if a subcontract factory is under an environment enabling the receipt of the CAD data, a supplier (subcontract_factory) even cannot open the CAD data unless the format of the CAD data from the orderer fits a format of an automatic programming tool (software) of a numerical control device owned by the one's company (supplier), or unless the supplier owns CAD application software fit to the CAD data from the orderer.

Therefore, in the placement and receipt of an order for parts machining and the like between the parent company and the subcontract factory, in spite of the fact that the CAD data exists, paper drawings printed out from the data have been delivered by mail, a parcel delivery service, a delivery service by motorcycle and the like in many cases. This is not only a waste of time but also will cause the subcontract factory or the like to miss business opportunities even if a good machining equipment is provided therewith.

Moreover, in recent automatic programming tools for the numerical control device, there have been highly functional ones having functions not only of preparing a machining program but also of preparing data of development views and solid views for the sheet metal machining, performing drawing and so on from the design CAD data. However, in long-time subcontract factories and the like, many factories do not use such new tools and depend on experiences of skilled workers.

Moreover, in the subcontract factories and the like, in many cases, switching of the automatic programming tool to new one is disliked, and one already accustomed to be used is desired to be used due to the existence of skilled workers and the shortage of personnel in charge of programming. Thus, limitations occur in reduction of work time. Moreover, even if the highly functional automatic programming tool is introduced, it is conceived that, because the way of its use is unclear due to its multi-function, the good highly functional automatic programming tool may not take an active part fully.

The present invention was made in order to solve the problems as described above. It is an object of the present invention to provide an outsourcing service apparatus regarding electronic drawing data, which is adapted to assist the use of the CAD data in the CAD and the automatic programming tool, which are owned by the supplier, and to assist the use of the functions of the highly functional automatic programming tool no matter how the format of the CAD data (electronic drawing data) from the orderer may be, thus realizing the reduction of work time and appropriate and efficient placement and receipt of orders.

SUMMARY OF THE INVENTION

Disclosure of the Invention

In order to achieve the foregoing object, an outsourcing service apparatus according to the present invention is one that receives electronic drawing data prepared in an orderer, performs data conversion for the received electronic drawing data into electronic drawing data in a format designated by a supplier, and transmits the electronic drawing data subjected to data conversion to the supplier or a designated destination.

A first technical aspect of the present invention is an outsourcing service apparatus, wherein the outsourcing service apparatus receives electronic drawing data prepared in an orderer, performs data conversion for the received electronic drawing data into electronic drawing data in a standard format, and transmits the electronic drawing data subjected to data conversion to a supplier or a designated destination. As the electronic drawing data in the standard format, there is CAD data in accordance with the DXF specification or the IGES specification.

A second technical aspect of the present invention is an outsourcing service apparatus, wherein the outsourcing service apparatus receives electronic drawing data prepared in an orderer or a supplier, and performs at least one data preparation of (1) to (8) based on the received electronic drawing data. Specifically:

(1) electronic drawing data from which data unnecessary for machining performed in the supplier is extracted and deleted among data included in the received electronic drawing data is prepared;

(2) the machining performed in the supplier is sheet metal machining including bending, and electronic drawing data of a development view is prepared from the received electronic drawing data;

(3) the machining performed in the supplier is sheet metal machining including bending, and electronic drawing data of a solid view after the bending is prepared from the received electronic drawing data;

(4) a machining program for a numerical control device is prepared from the received electronic drawing data;

(5) estimation of machining cost is performed based on the received electronic drawing data, and estimation data is prepared;

(6) video data of a machining simulation in accordance with a machining equipment of the supplier and a tool thereof is prepared based on the received electronic drawing data;

(7) the optimum machining equipment and tool are selected based on the received electronic drawing data, and data indicating these is prepared; and (8) optimum software is selected based on the received electronic drawing data, and data indicating this is prepared. Then, the apparatus transmits the prepared data to the supplier or a designated destination.

A third technical aspect of the present invention is a method for proposing an optimum sheet metal machining equipment (including assistance computer software) to a client, the method including the steps of: receiving electronic drawing data specifying a product from a client through a communication line such as the Internet; selecting an optimum machining equipment for manufacturing the product specified by the drawing from a plurality of machining equipments in a memory of a computer; and sending data of the optimum machining equipment to the client through the communication line such as the Internet.

Another technical aspect of the present invention is a method for proposing an optimum sheet metal machining equipment (including assistance computer software) to a client, wherein the method can further include the following features.

(1) The optimality (degree of appropriateness) for manufacturing a product, that is, a judgment as to whether or not the equipment is optimum is determined as a function of an increased profit.
(2) The optimality is determined as a function of a parameter of at least one of machinability, machining quality, a machining time and a set-up time.
(3) The optimum machining equipment includes the optimum machining machine, the optimum die, or the optimum software.
(4) When the optimum machining equipment is proposed to the client, the increased profit is proposed together with the proposal.
(5) The product specified by the drawing is a product manufactured from sheet metal.
(6) The method includes the step of, when the drawings received from the client are a three view, preparing at least one of a development view and a solid view based on the three view, and sending the prepared drawing to the client.

BRIEF DESCRIPTION OF THE DRAWINGS

Brief Description of the Drawings

Figure 1:
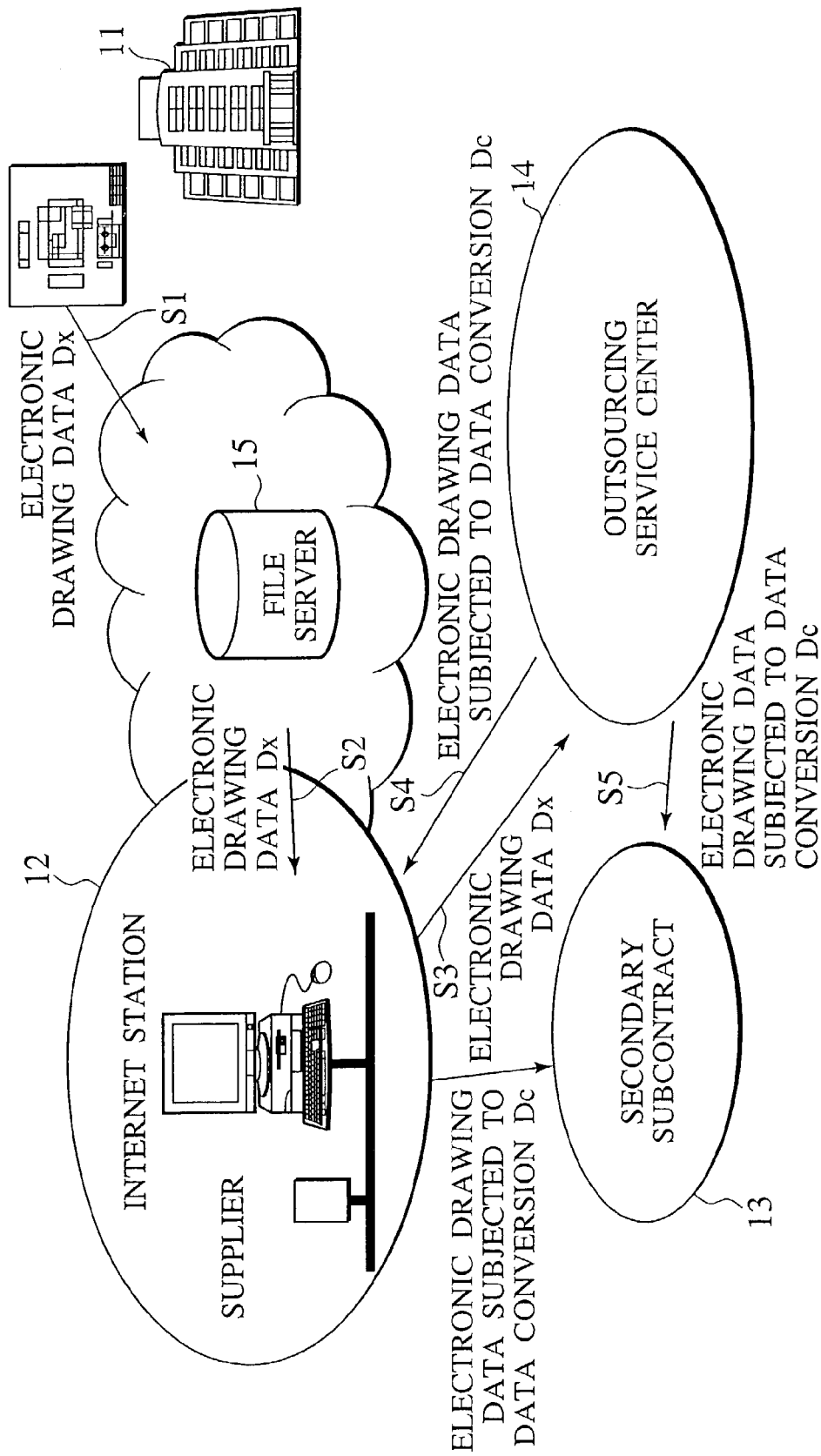
Figure 2:
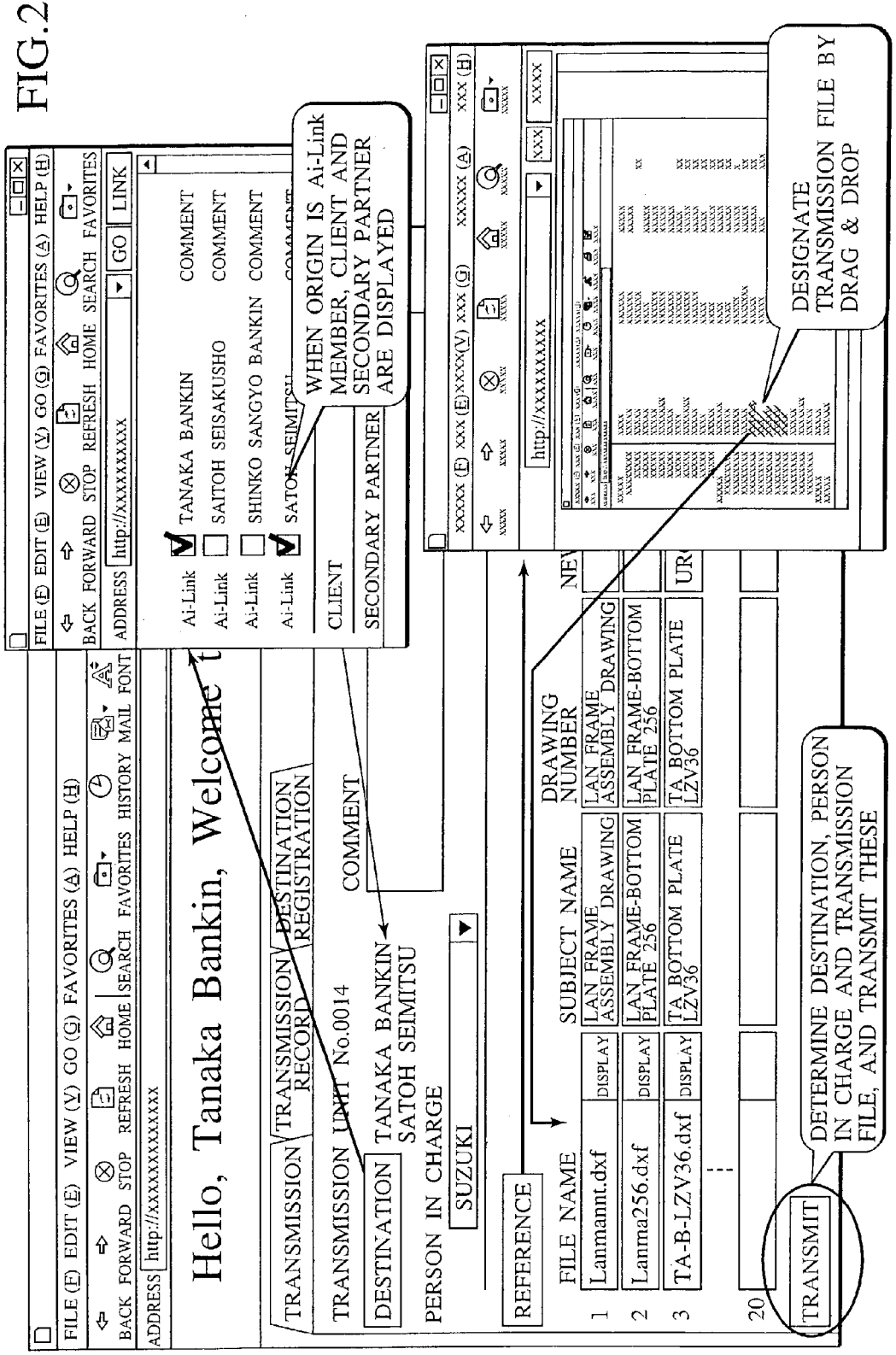
Figure 3:
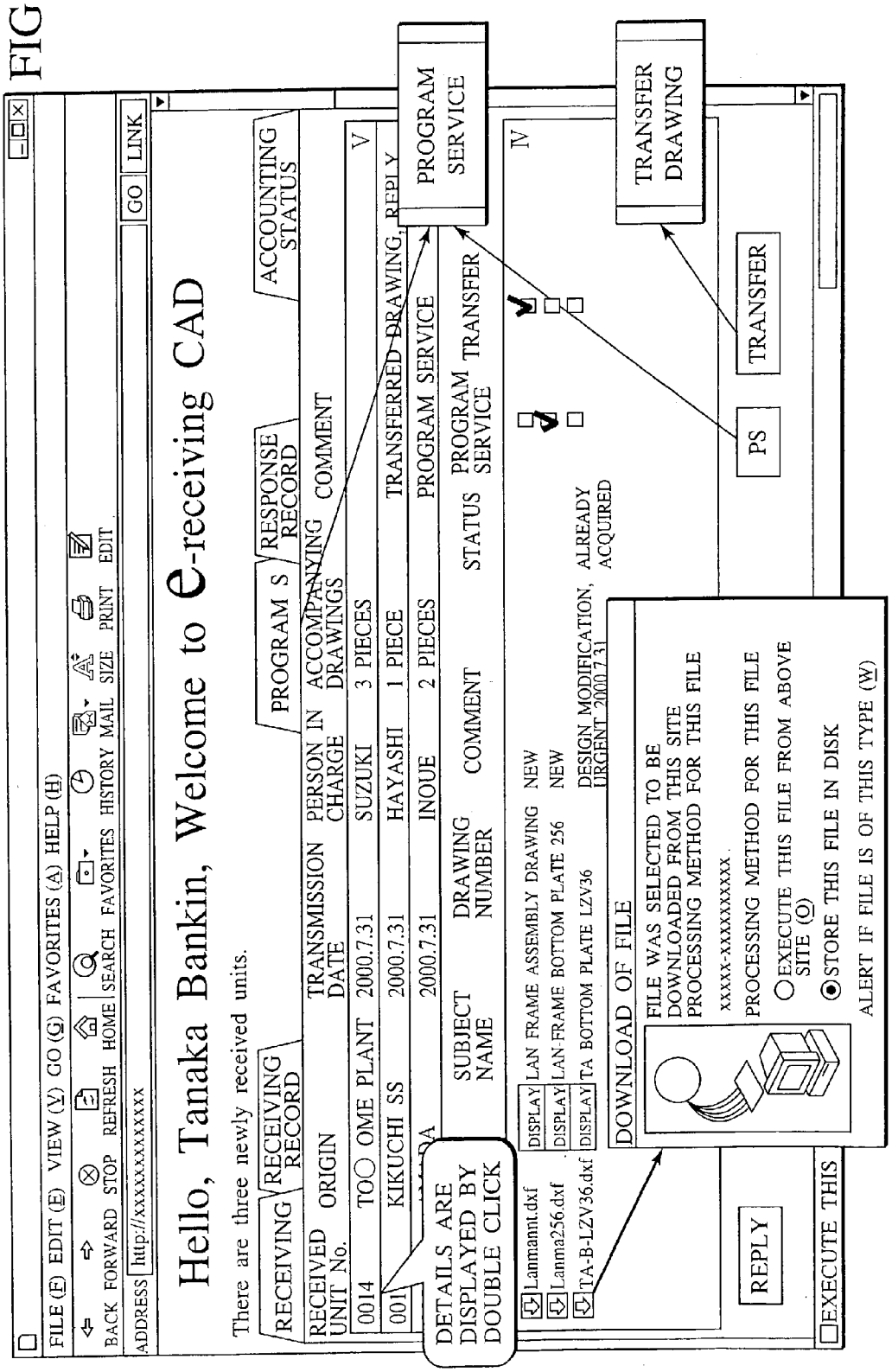
Figure 5:
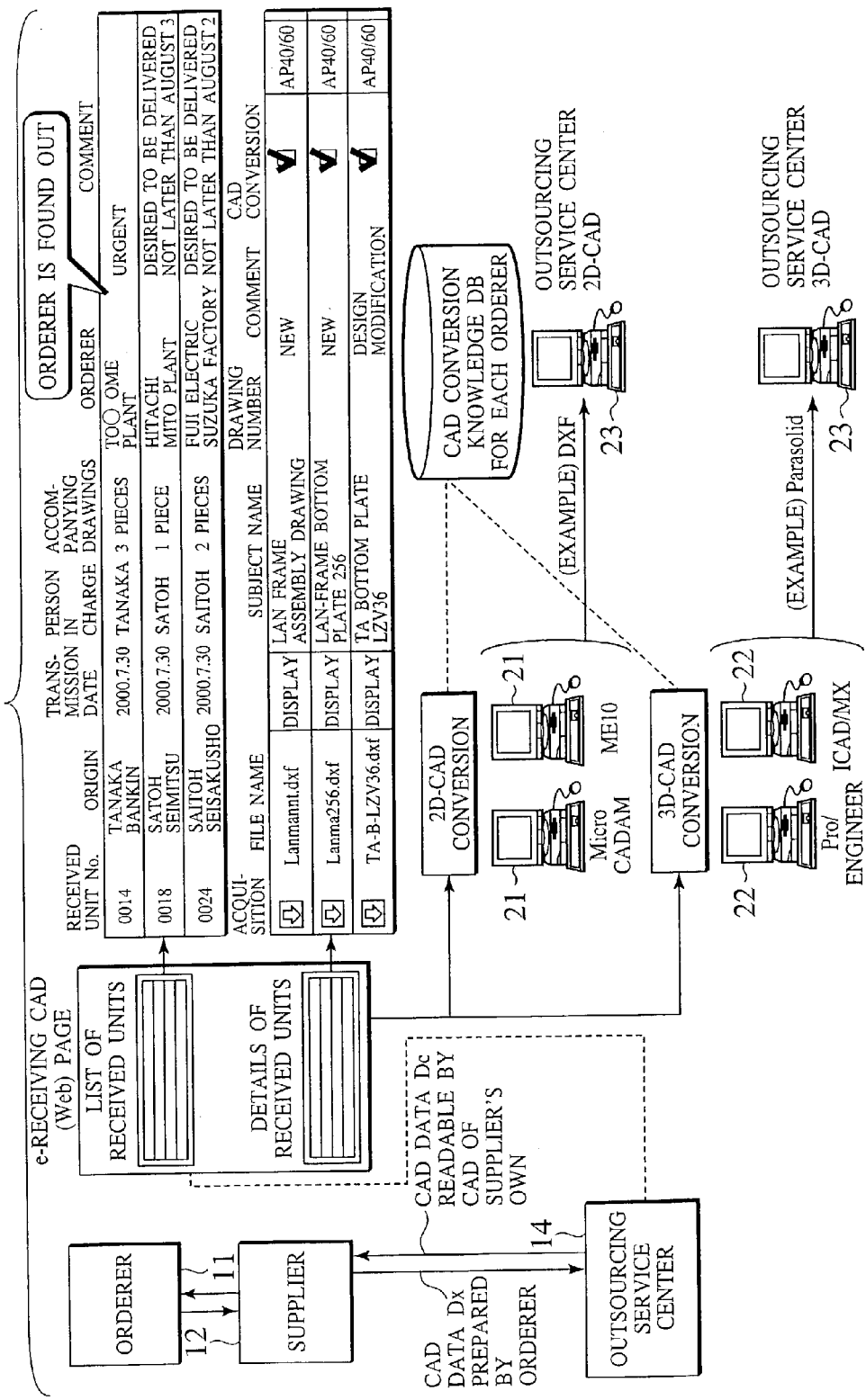
Figure 6:
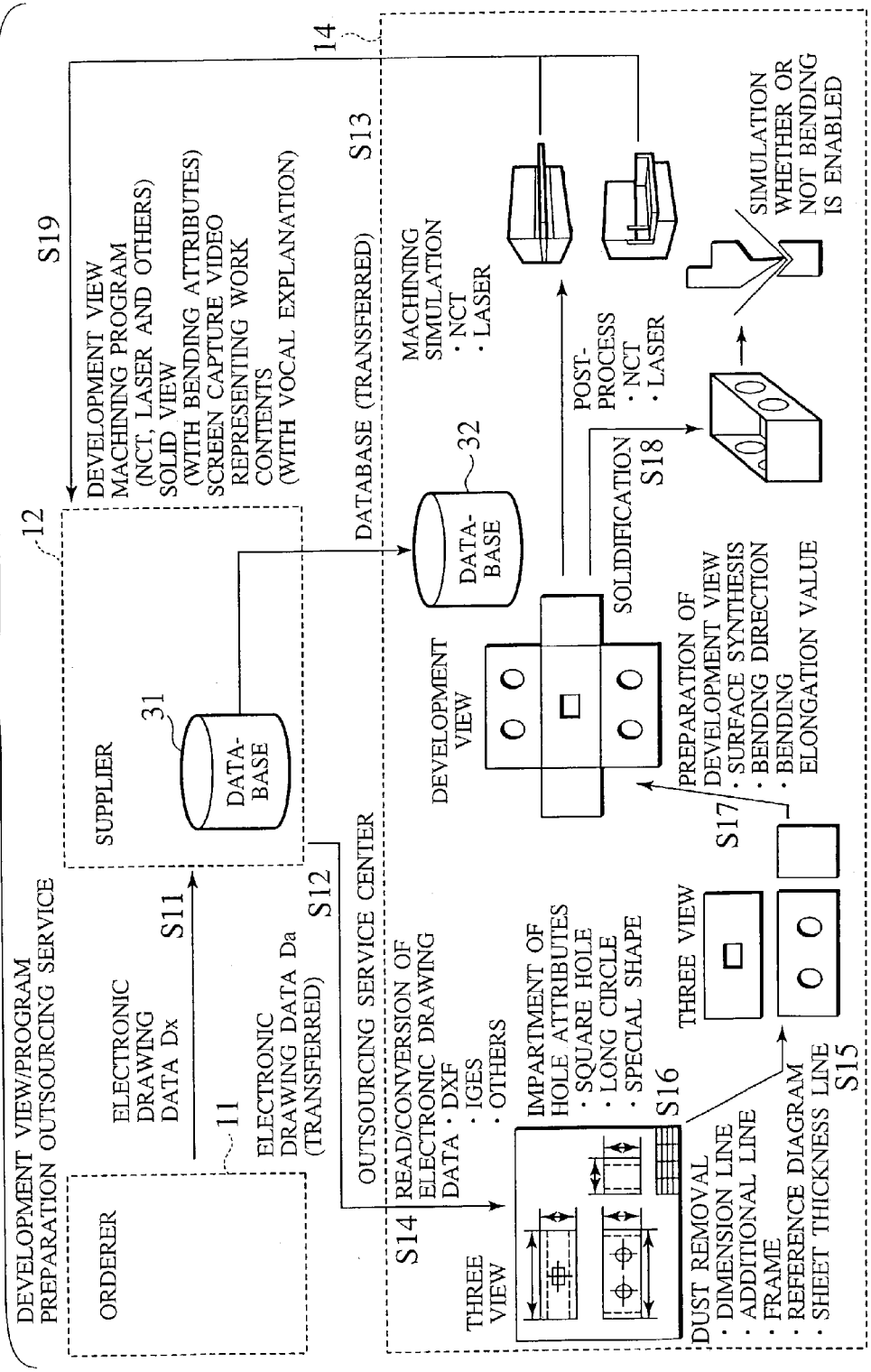
Figure 7:
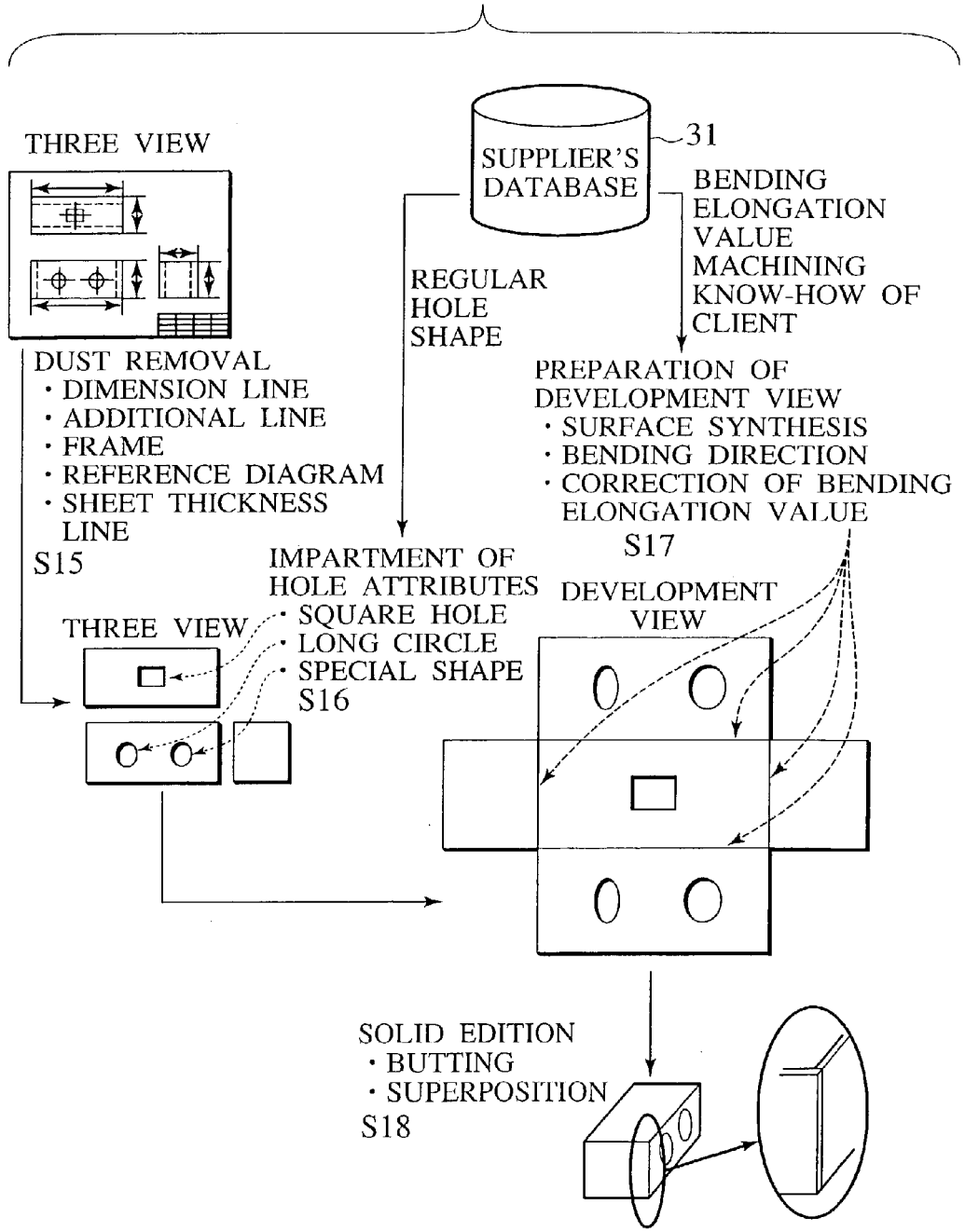
Figure 8:
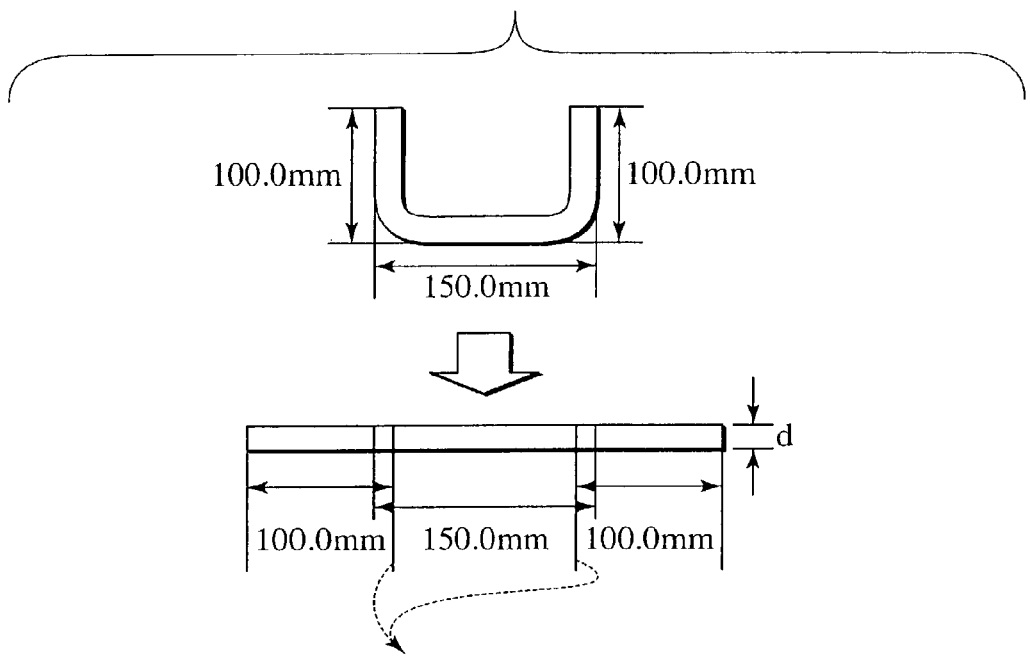
Figure 9:
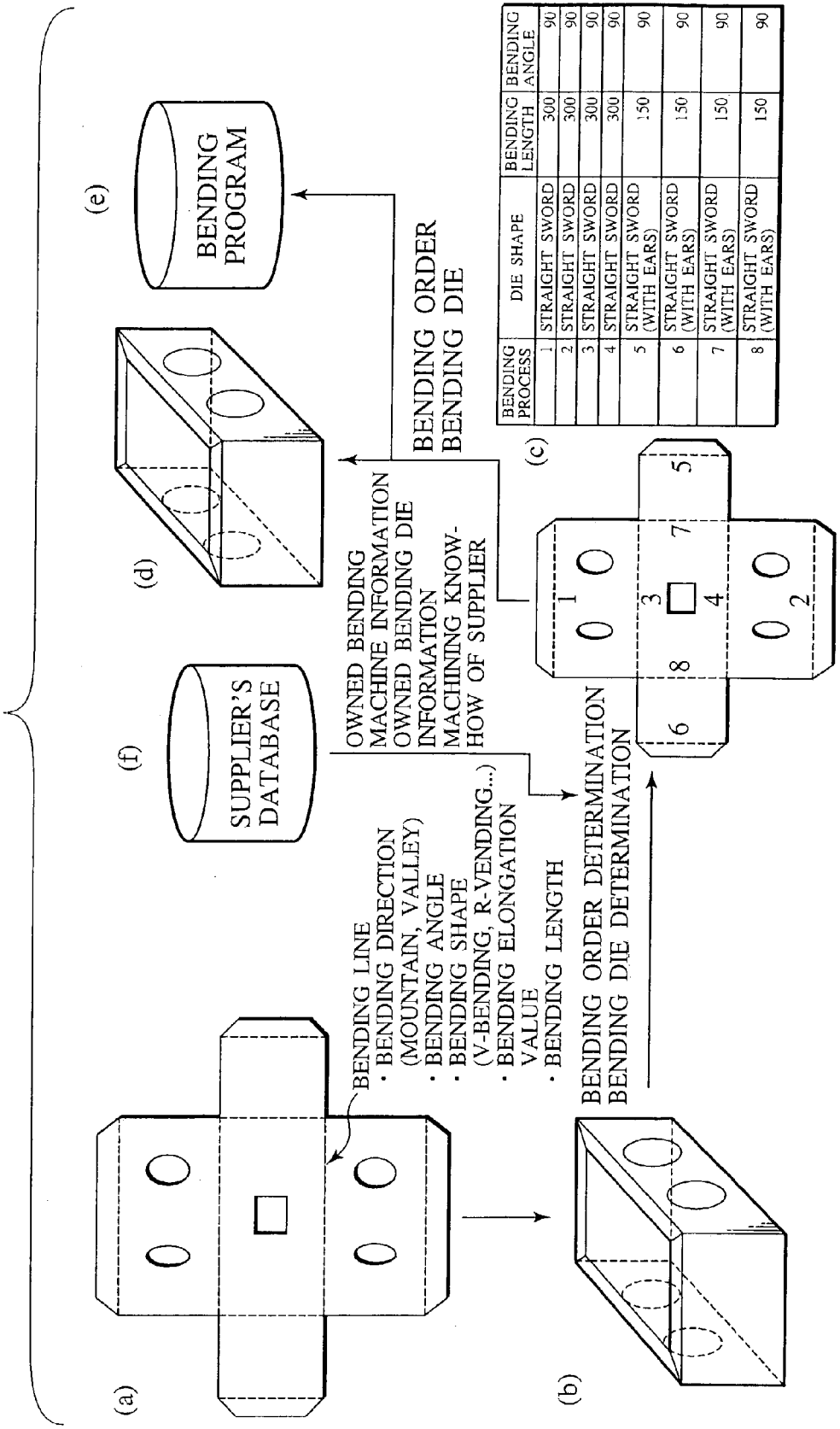
Figure 10:
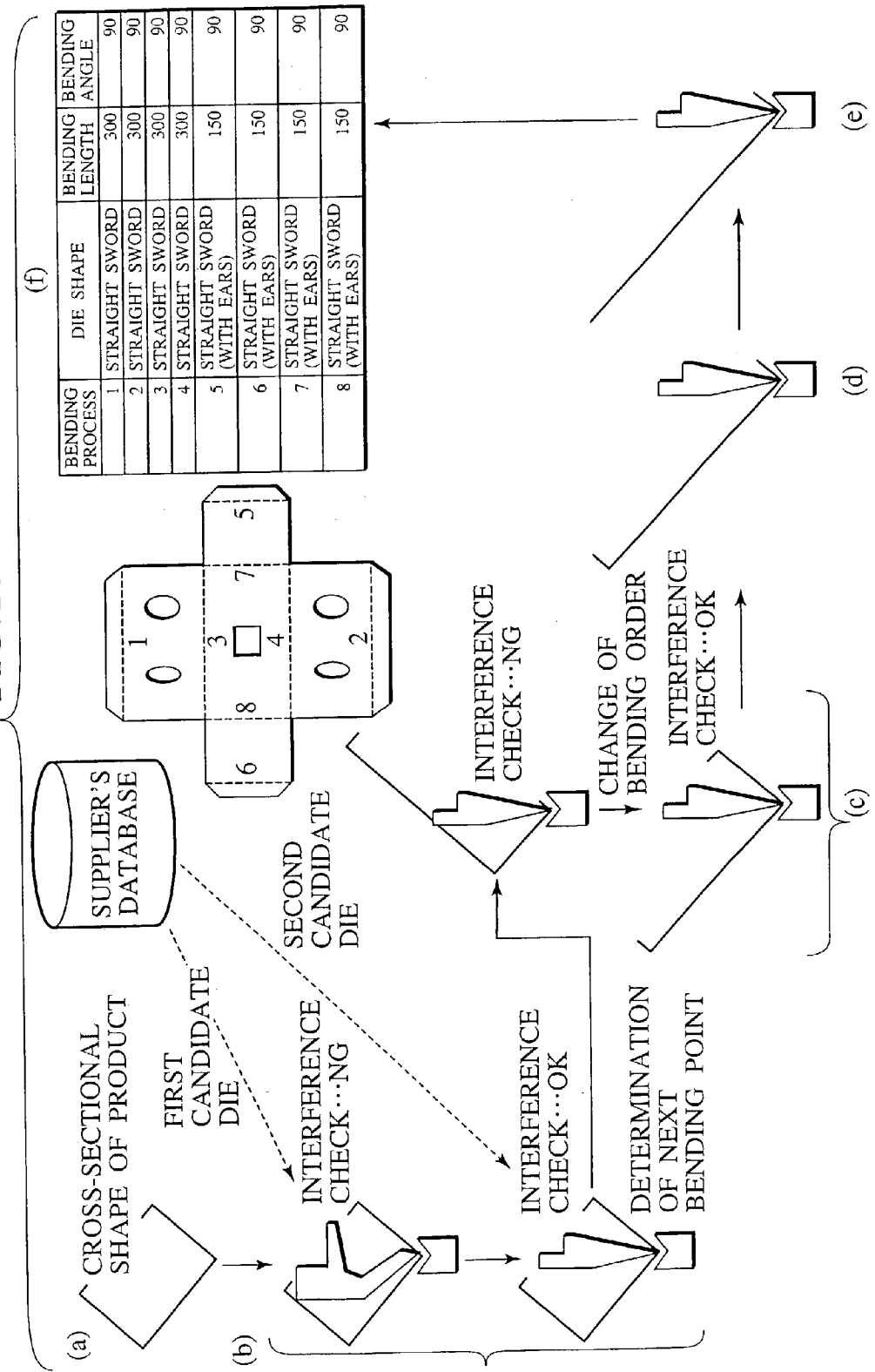
Figure 11:
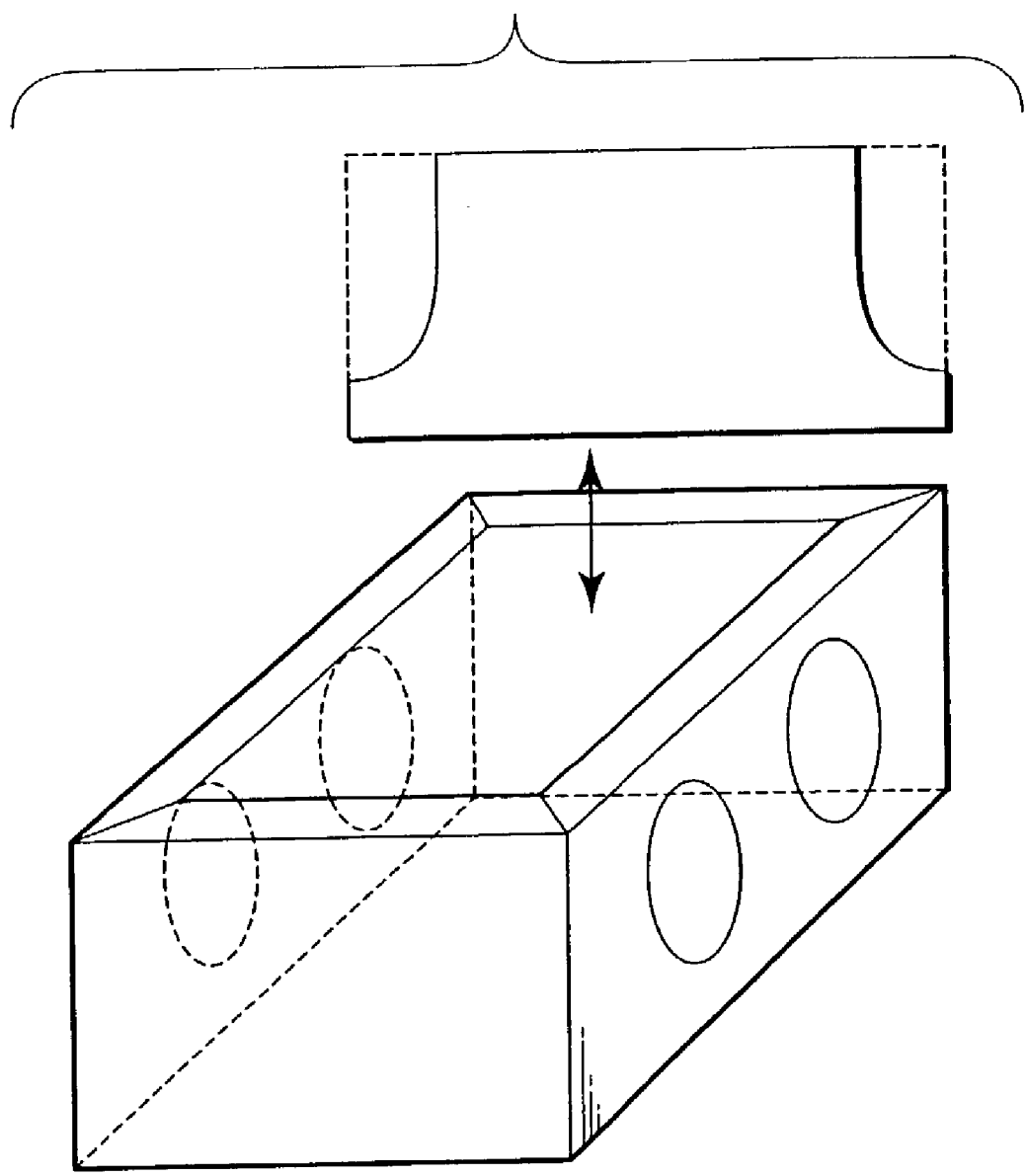
Figure 12:
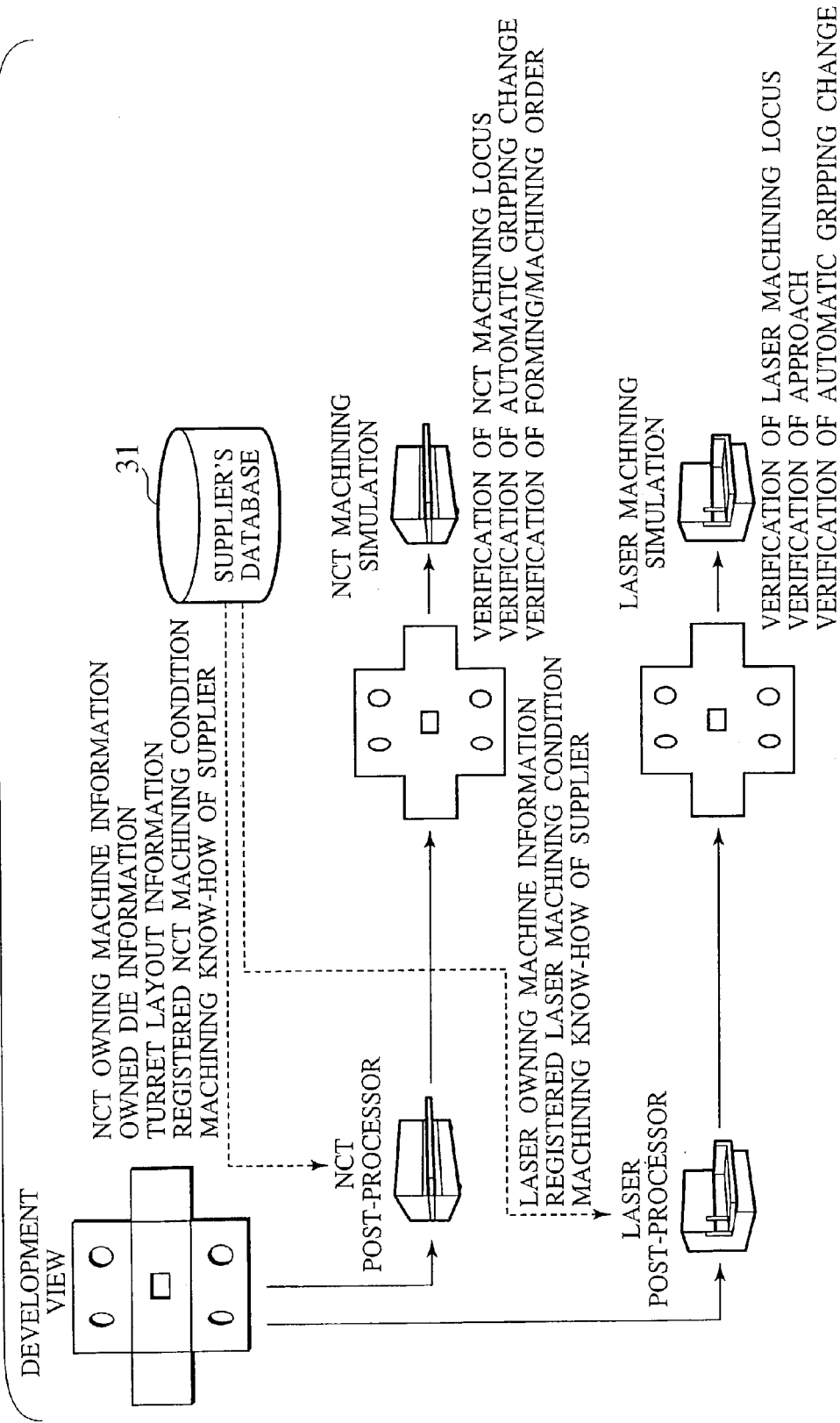
Figure 14:
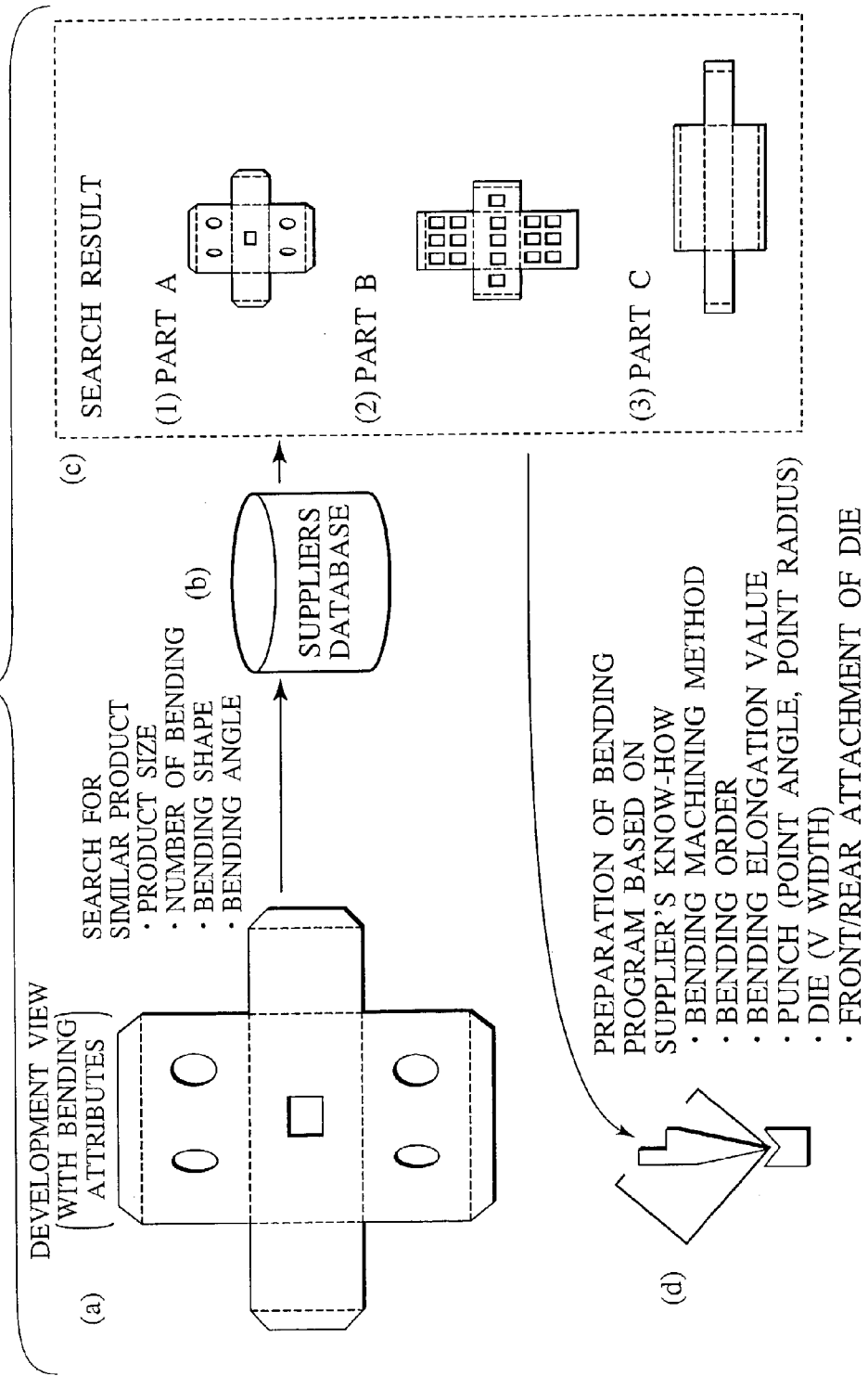
Figure 15:
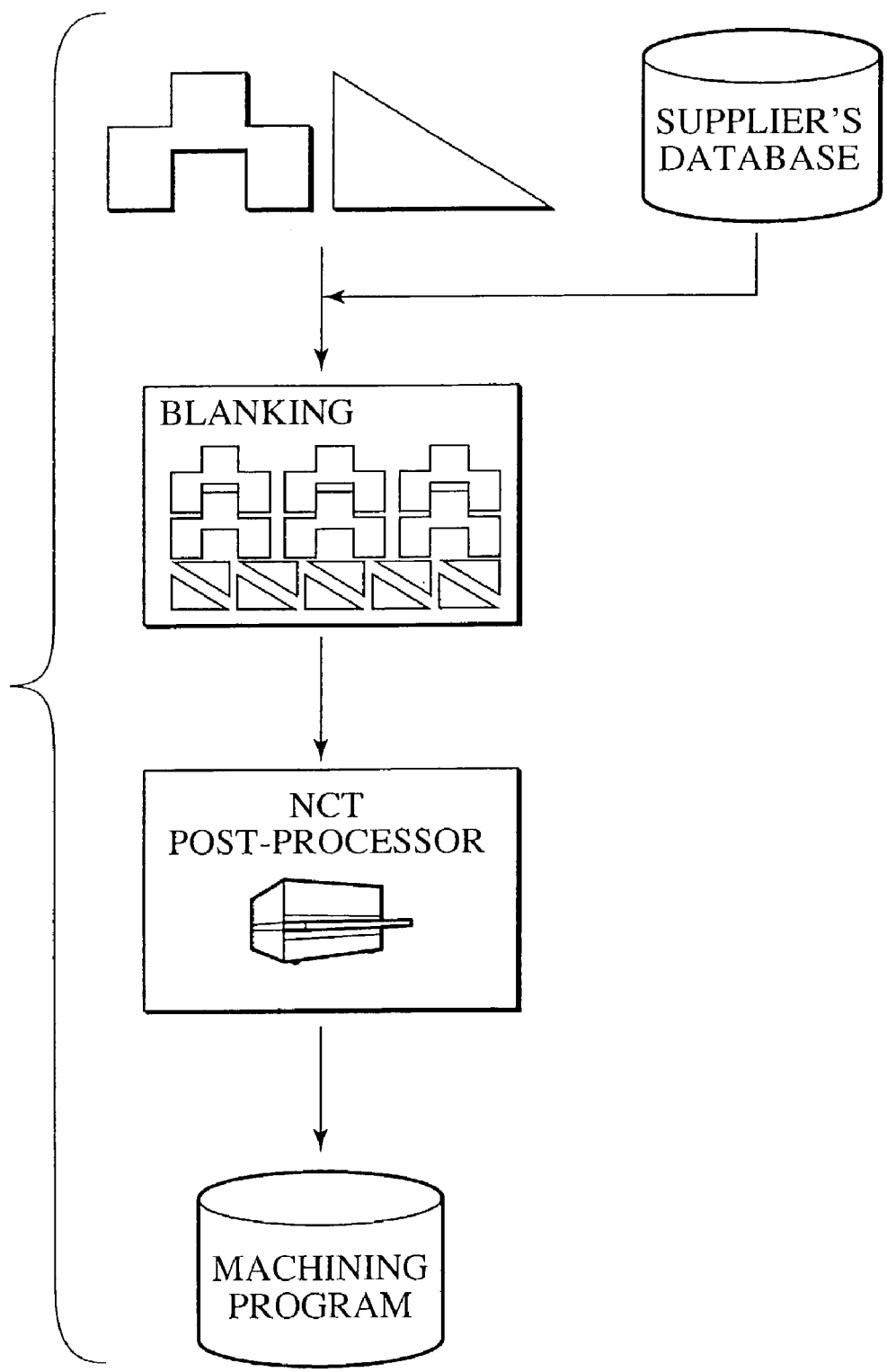
Figure 17:
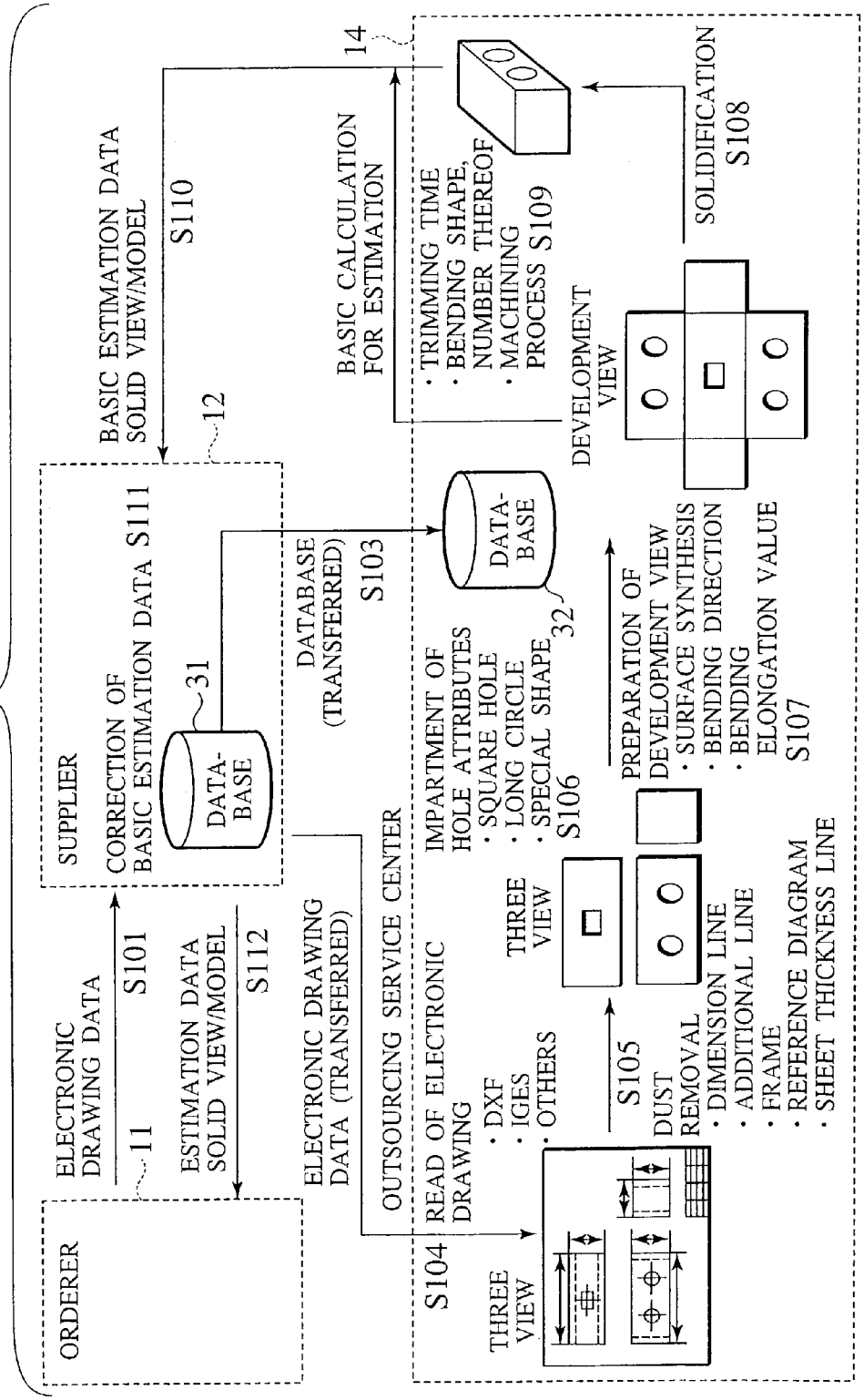
Figure 18:
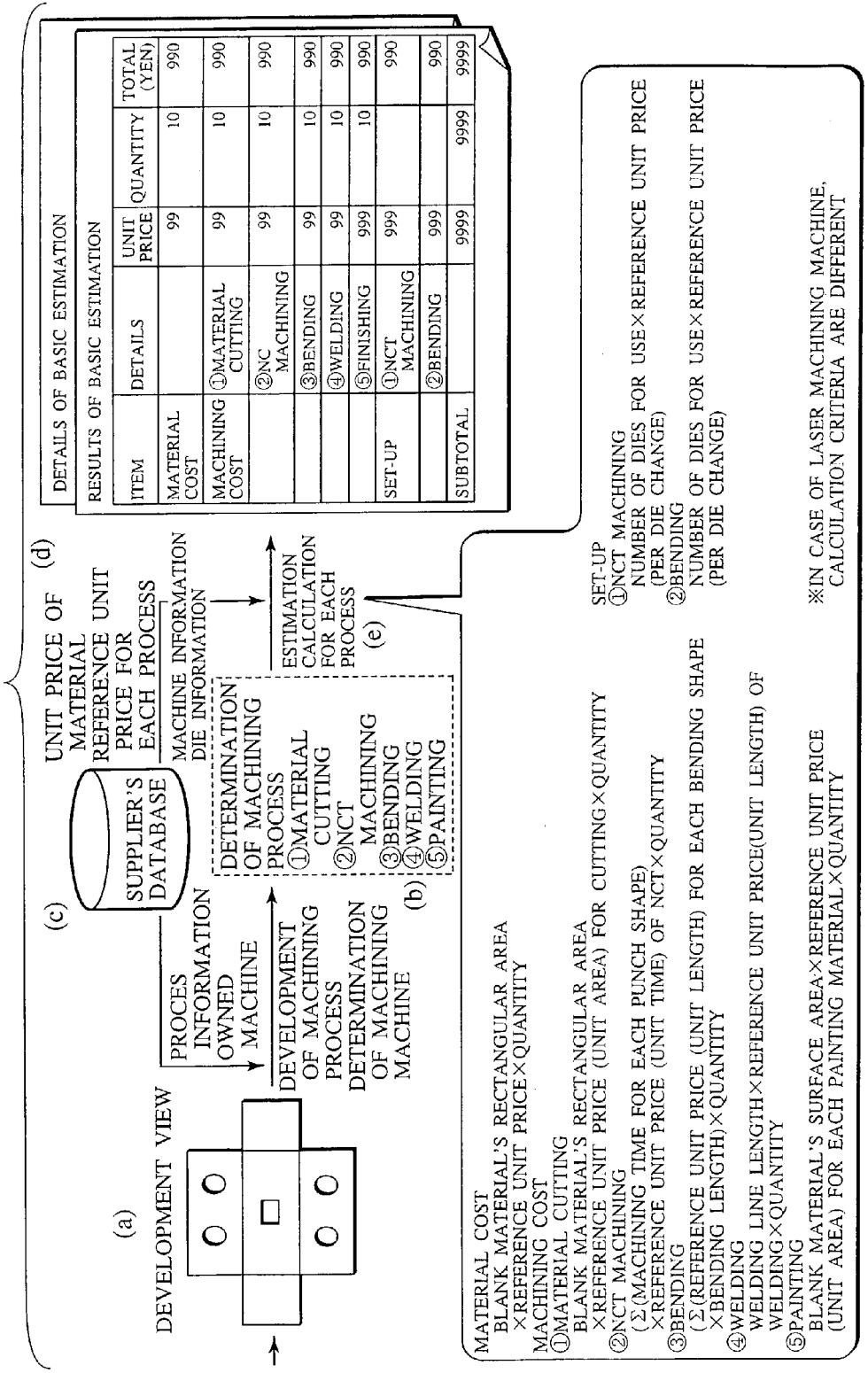
Figure 19:
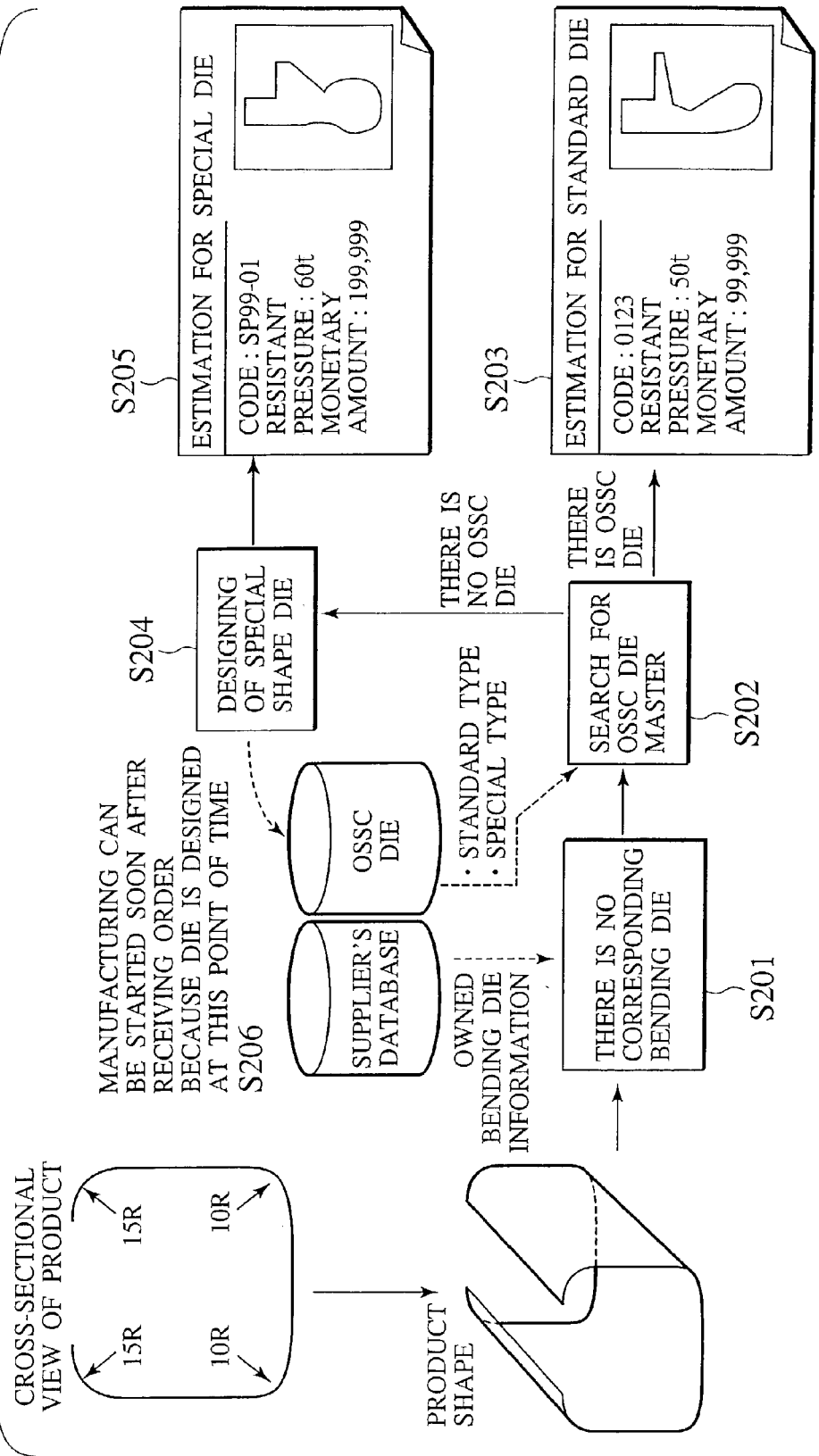
Figure 22:
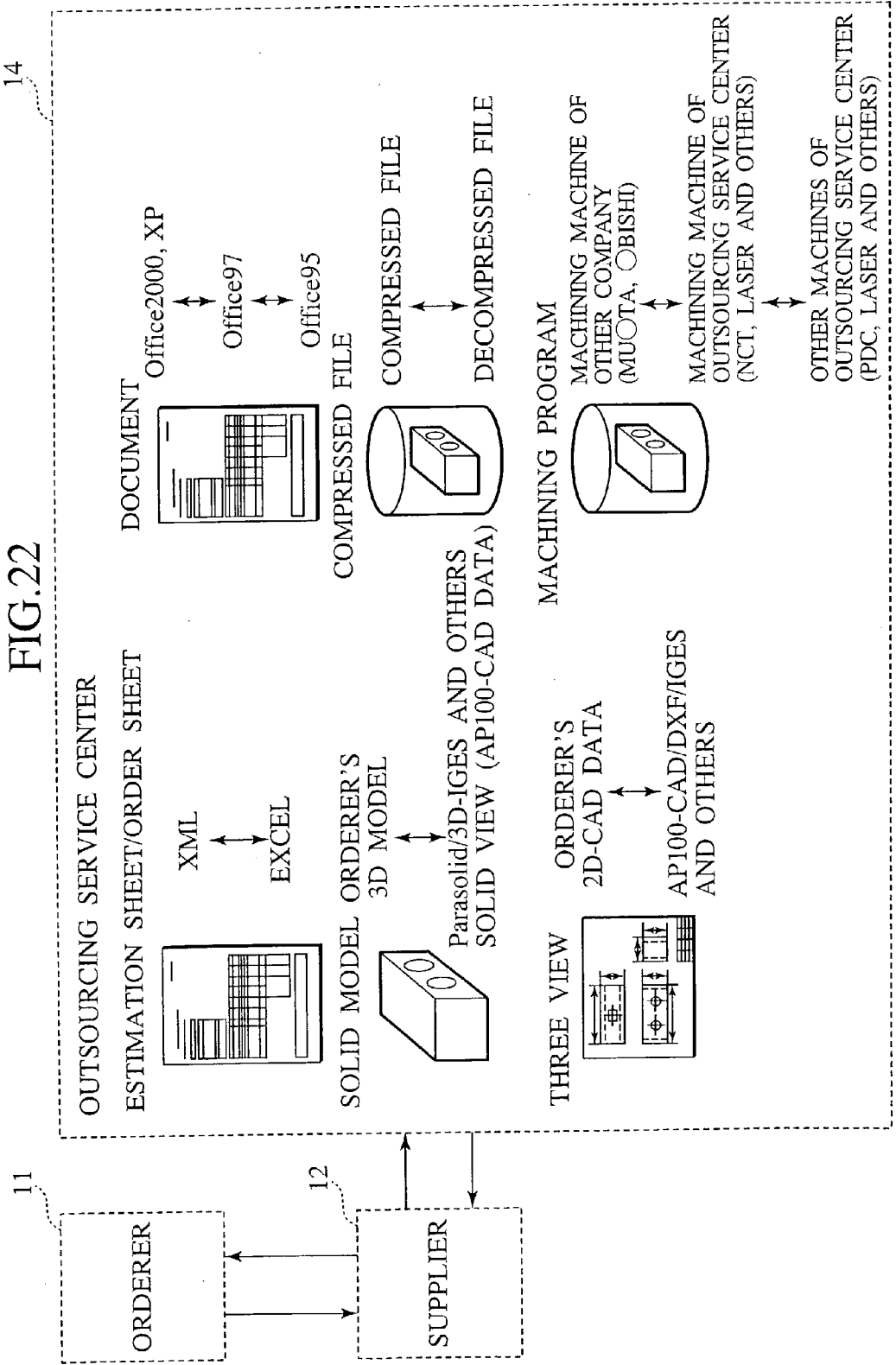
Figure 24:
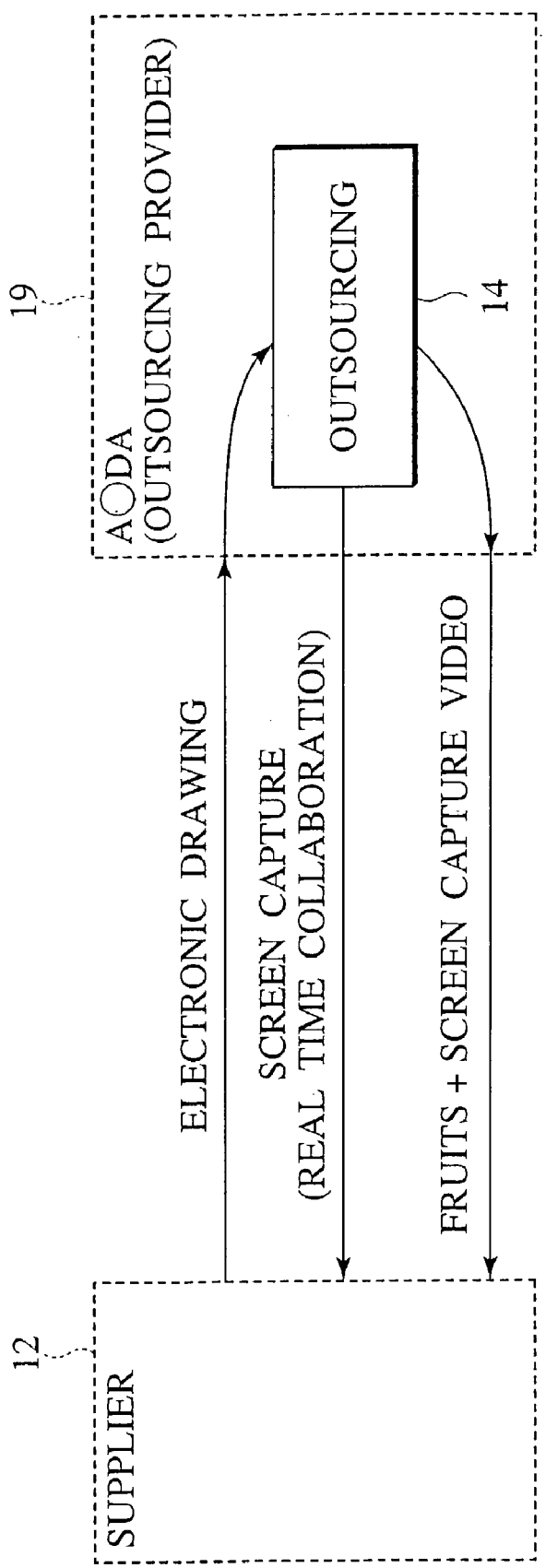
Figure 25:
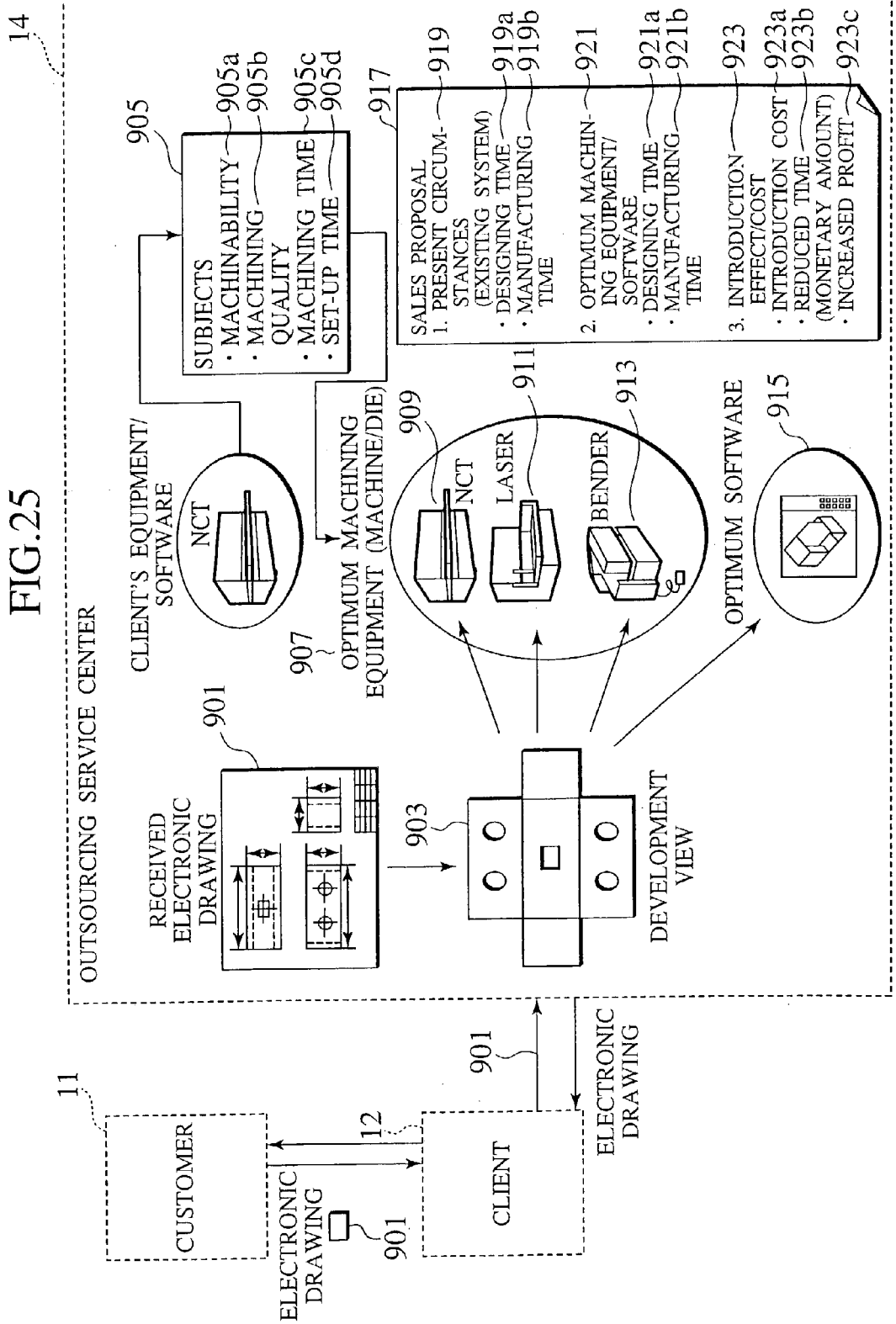
Figure 26:
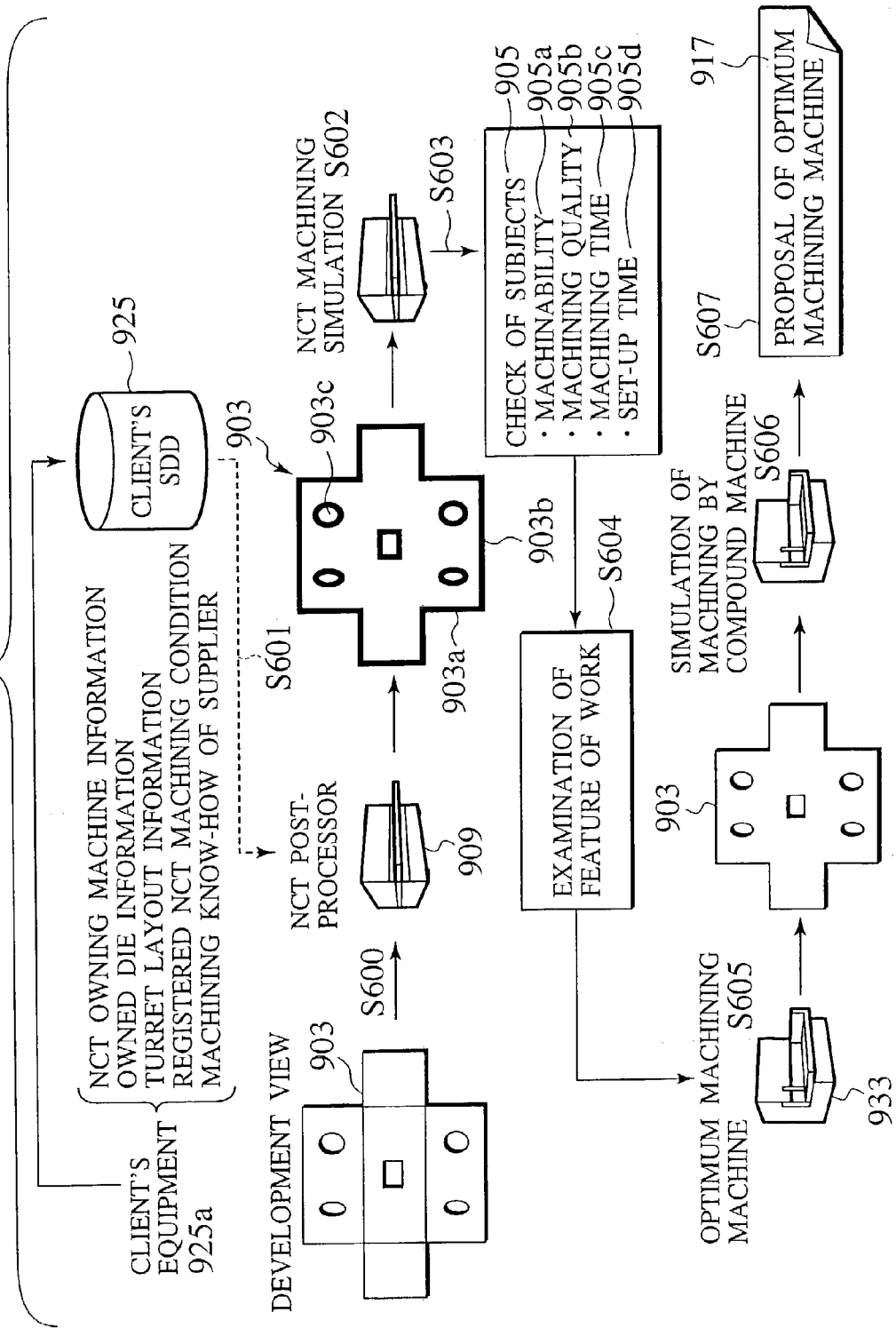
Figure 28:
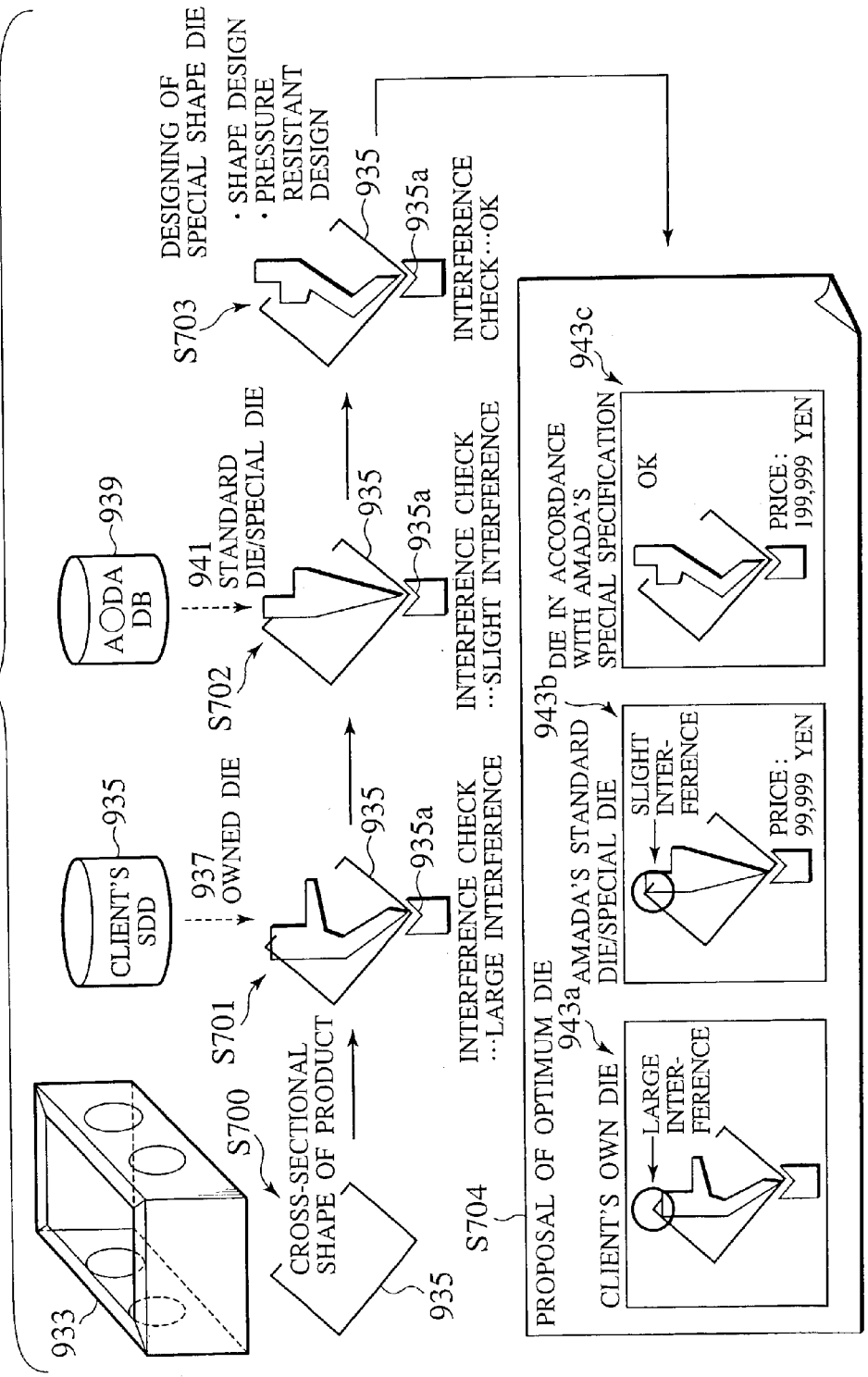

FIG. 1 is a system constitution diagram showing one embodiment of a service system including an outsourcing service apparatus according to the present invention;

FIG. 2 is an explanatory view illustrating a screen example in an orderer when data is transmitted to a supplier;

FIG. 3 is an explanatory view illustrating a screen example in the supplier when the data from the orderer or an outsourcing service center is received;

FIG. 4 is an explanatory view illustrating a screen example in the outsourcing service center when the data from the supplier is received;

FIG. 5 is an explanatory view illustrating CAD data conversion;

FIG. 6 is a system constitution diagram showing one embodiment of the service system including the outsourcing service apparatus according to the present invention;

FIG. 7 is an explanatory view illustrating a preparation procedure of data of a development view by means of supplier-specific information;

FIG. 8 is a view for explaining corrections of bending elongation values in the preparation of the development view in FIG. 7;

FIG. 9 is an explanatory view showing a preparation procedure of data of a solid view by means of the supplier-specific information;

FIG. 10 is an explanatory view illustrating a determination procedure of a bending order and a bending die;

FIG. 11 is a view exemplifying a determination procedure of the bending die when machining a box-shaped object;

FIG. 12 is an explanatory view illustrating a preparation procedure of a NC machining program by means of the supplier-specific information;

FIG. 13 is a view illustrating a concrete example of the preparation procedure of the program in FIG. 12;

FIG. 14 is an explanatory view illustrating a preparation procedure of a NC machining program by succeeding know-how of the supplier: FIG. 14(a) is a development view with bending attributes; FIG. 14(b) is a supplier's database; FIG. 14(c) is a search result of similar products; and FIG. 14(d) is a bending program based on the know-how of the supplier;

FIG. 15 is an explanatory view illustrating a preparation procedure of a nesting program by means of the supplier-specific information;

FIG. 16 is a view illustrating a concrete example of the preparation procedure of the program in FIG. 15;

FIG. 17 is a system constitution diagram showing one embodiment of a service system including an outsourcing service apparatus according to the present invention;

FIG. 18 is an explanatory view illustrating a preparation procedure of estimation data;

FIG. 19 is an explanatory view illustrating a preparation procedure of estimation data of die cost;

FIG. 20 is a table showing an overall outline of the outsourcing of the development view and program preparations described with reference to FIG. 18 and the like as an example of an offered menu, in which a 2D-CAD format of the orderer is converted into a 2D-CAD format (for example, DXF) handleable by CAD/CAM software made by the outsourcing service center in format conversion (1), and a 3D-CAD format of the orderer is converted into a 3D-CAD format (for example, Parasolid) handleable by the CAD/CAM software made by the outsourcing service center in format conversion (2);

FIG. 21 is an explanatory view illustrating a solid model preparation procedure in which a supplier is differentiated;

FIG. 22 is a diagram illustrating another example of the data conversion service described with reference to FIG. 5 and the like;

FIG. 23 is a table showing an overall outline of the estimation outsourcing described with reference to FIG. 6 and the like as an example of offered menus, in which format conversions (1) and (2) are similar to those in FIG. 20;

FIG. 24 is a diagram illustrating a screen capture video to be sent to the supplier 12 together with fruits by the out sourcing (with reference also to FIG. 6);

FIG. 25 is a diagram schematically illustrating a method for proposing an optimum machining equipment (including optimum machining software) as another aspect of the invention of this application;

FIG. 26 is a diagram for explaining a process for proposing an optimum machining machine in manufacturing a sheet metal product (or a sheet metal part) corresponding to a drawing based on the drawing data 901 or 903 as client-specific information;

FIG. 27 is a diagram illustrating concrete examples of subjects in the process in FIG. 26;

FIG. 28 is a diagram illustrating a method for proposing an optimum bending die as an optimum die for manufacturing a product corresponding to the drawing based on the drawing information (or data) 901 or 903 as the client-specific information; and FIG. 29 is a diagram illustrating a method for proposing assistance computer software useful for manufacturing a product corresponding to the development view 945, the solid view 947, and the front view 949 and the cross-sectional view 951, both of which are based on the solid view 947, based on these drawings.

DESCRIPTION OF THE PREFERRED EMBODIMENT

Best Mode for Carrying Out the Invention

The embodiments of the present invention will be described below in detail with reference to the accompanying drawings.

Electronic Drawing Data Conversion Service

FIG. 1 shows one embodiment of a service system including an outsourcing service apparatus regarding electronic drawing data according to the present invention.

In this service system, there exist the orderer 11, the supplier (primary subcontract) 12, the secondary subcontract 13, and the outsourcing service center (OSSC) 14. The substances of these are computers communicable to one another.

Moreover, there exists the file server 15 of an Internet service provider that mediates the transmission and receipt of the electronic drawing data (CAD data) among these. In this case, the above-described computers mount thereon Web browsers and mailers, which are accessible to the file server 15 of the Internet service provider.

Note that, though FIG. 1 illustrates that data communications other than between the orderer 11 and the supplier 12 are carried out directly between two parties, all the data communications are actually carried out through the file server 15 of the Internet service provider.

Next, the process of the placement and receipt of an order by the outsourcing service center 14, which is accompanied with electronic drawing data conversion, will be described.

(1) The orderer 11 accesses the file server 15 and transmits electronic drawing data (original CAD data) Dx prepared by a design CAD used by his company to the file server 15. FIG. 2 illustrates a computer screen example when the data is transmitted. In this data transmission, a destination (supplier 12), an attention thereof, and files of the electronic drawing data Dx to be transmitted are designated (S1).

The destination is determined in such a manner that a button for the destination on the transmission screen is clicked to open a shortcut menu of a supplier list and to display suppliers previously registered thereon, and the destination is selected from the displayed suppliers and clicked.

The transmission file is determined in such a manner that a reference button on the transmission screen is clicked to launch a file management program (explorer), and on the file display screen of the file management program, a file name is dragged and dropped into the column of the file name on the transmission screen. The transmission is performed by clicking a transmission button on the transmission screen.

(2) The supplier 12 accesses the file server 15 and receives therefrom the identifier (ID) of the orderer, the identifier of the electronic drawing data Dx and the like, which have been sent from the orderer 11 to his company (S2). FIG. 3 illustrates a computer screen example when the data is received. As shown in FIG. 3, the identifier of the electronic drawing data Dx includes a file name, a subject name, a drawing number and a comment, and the file name includes a CAD format name.

The received data is classified for each origin (orderer) and displayed in detail for each origin. In the detail display, the file name and the like are displayed. Here, when the acquisition button is clicked, each file is downloaded to the computer of the supplier's own.

Moreover, the supplier 12 can click the box of the program service (CAD data conversion service), which is provided in each file. Here, the format of the CAD data conversion and data preparation service types to be described later (refer to FIGS. 6 to 29) can be designated. Subsequently, the PS button is clicked. Thus, the designated file identifier, identifier of the orderer 11 and identifier of the supplier 12 and the like are transmitted to the file server 15 as the outsourcing service center 14 (S3).

Moreover, by clicking the transfer button provided in each file, the designated file is transmitted to the file server 15 with a previously designated transfer destination (for example, the secondary subcontract 13) taken as a transmission destination thereof.

(3) The outsourcing service center 14 accesses the file server 15 and receives the electronic drawing data Dx from the orderer through the file server 15, which has been sent from the supplier 12. FIG. 4 illustrates a computer screen example when the data is received.

(4) The outsourcing service center 14 downloads the file of the received electronic drawing data Dx, converts the downloaded file into electronic drawing data Dc in a format specified by the supplier 12, and transmits the electronic drawing data Dc subjected to the data conversion to the file server 15 (S4). In this case, when the supplier 12 uses, for example, the CAD of the Amada AP40 or AP60, the electronic drawing data Dc is the CAD format data of the AP40 or AP60. When the format data conversion is not designated, the downloaded file is converted into a CAD standard format in accordance with the DXF specification, the IGES specification or the like.

Note that the electronic drawing data Dc having been subjected to the data conversion can be transmitted through the file server 15 to a destination (for example, the secondary subcontract 13 or the branch office of the outsourcing service center 14, which is geometrically close to the supplier 12) designated by the supplier 12 (S5).

The supplier 12 accesses the file server 15 and receives therefrom the electronic drawing data Dc having been subjected to the data conversion, which has been sent from the outsourcing service center 14 to his company. Such data receipt is carried out also on the data screen shown in FIG. 3. When the data is downloaded to his computer, the acquisition button may be clicked. When the data is transferred to the secondary subcontract 13, the transfer box may be clicked, and then the transfer button may be clicked.

Thus, the supplier 12 can easily use the CAD data by means of the CAD application software used by the supplier 12 himself no matter how the format of the CAD data from the orderer 11 may be. Moreover, even if the format of the CAD data from the orderer 11 does not fit the format of the automatic programming tool (software) of the numerical control device owned by the supplier 12, the supplier 12 can acquire the CAD data fit thereto. Thus, the placement and receipt of the order by the paper drawings can be eliminated, and rapid placement and receipt of an order is going to be carried out.

The above-described procedure between the orderer 11 and the supplier 12 through the outsourcing service center 14 can be directly applied to a procedure between the supplier 12 as a secondary orderer and the secondary sub-contract 13 as a secondary supplier through the outsourcing service center 14.

FIG. 5 illustrates a concrete example of the electronic drawing data conversion in the outsourcing service center 14. The data conversion includes both of 2D-CAD conversion and 3D-CAD conversion by the computers 21 and 22 incorporating therein data conversion software. Moreover, even though the data may be of the same CAD, there is a format rule specific to each orderer 11. Therefore, the rules are stored in the knowledge database 23 and shared. Moreover, in order to verify that the data has been converted without any lack of information, preferably, on the computer 24 and the like, the data is read out by a CAD in accordance with a format having been converted and verified (data preparation service for a development view, a solid view, a machining program and a machining simulation).

Outsourcing Service System 1

FIG. 6 shows one embodiment of the service system including the outsourcing service apparatus regarding electronic drawing data according to the present invention.

The electronic drawing data Dx is transmitted from the orderer 11 to the supplier 12 (S11). The outsourcing service center 14 receives the electronic drawing data Dx transferred from the supplier 12 (S12), and receives the data of the database 31 for information regarding the machining and the tool, which are owned by the supplier 12 (S13), and acquires the data in the database 32 in the center.

The electronic drawing data Dx transferred from the supplier 12 to the outsourcing service center 14 is a three view of a sheet metal machined part machined by a turret punch press, a laser machining machine and the like.

The outsourcing service center 14 reads the received electronic drawing data Dx, and then, for example, converts the data Dx into, for example, a standard format data D0 (S14).

Next, data unnecessary for the machining performed in the supplier 12, that is, data unnecessary for the sheet metal machining is extracted from the electronic drawing data D0, and electronic drawing data in which the unnecessary data is deleted is prepared. The data extracted and deleted from the electronic drawing data D0 includes data of a dimension line, an additional line, a frame, a reference diagram, a sheet thickness line and the like. This process is called a dust removal process. The dust removal process can be carried out by use of the layer function and hole chart function of the CAD (S15).

As one of the outsourcing services, the electronic drawing data having subjected to the dust removal process can be converted into format data designated by the supplier, and then can be returned to the supplier 12.

Note that, though the dust removal process has been performed after the CAD data format conversion from the electronic drawing data Dx into the standard format data D0 in the above description, the dust removal process can be first performed for the original format data Dx, and then the data having been subjected to the dust removal process can be converted into the standard format data D0. Moreover, the original format data Dx can be first converted into the format data designated by the client, and then the dust removal process can be carried out for the data having been subjected to the conversion.

When referring to FIG. 6 again, the outsourcing service center 14 imparts hole attributes to the electronic drawing data having been subjected to the dust removal process in order to prepare the NC machining program. The hole attributes are set based on information on regular hole shapes given by the database 31 of the supplier 12 (supplier-specific information), which includes a square hole, a long circle, a special shape and the like (S16).

The development view data is prepared in such a manner that surface syntheses are performed, bending directions are considered, and bending elongation values are corrected. The bending elongation values are determined in accordance with the type of the machining equipment and know-how of the supplier 12 in many cases, and such data can be acquired from the database 31 of the supplier 12 (S17). Specifically, as shown in FIG. 8, for example for a development length, a correction to subtract the bending elongation value will be required. However, this value is different depending on a machining method (air bend, bottoming and the like), a material, a sheet thickness, the way of taking an inner radius, a bending die (punch, die) or the like, and therefore, it is necessary to set the value for each supplier.

Next, data of a solid view added with bending attributes is prepared from development view data prepared as described above by a solid edition process (S18). The solid view is a drawing corresponding to a product having subjected to the bending, and from this solid view, verification can be made as to whether or not the bending or the like is appropriate. Moreover, a simulation whether or not the bending is enabled can be performed from the solid view (S19). Note that FIG. 7 illustrates details of the above-described preparations of the development view data and solid view.

Moreover, as illustrated in FIG. 9, the solid view can be prepared while determining a bending order and a die for use in consideration of the supplier-specific information. The development view (a) is added with bending attributes, and bending lines include information on bending directions (mountain, valley), bending angles, bending shapes (V-bending, R-bending and the like), bending elongation values and bending lengths. When determining the bending order and the bending die, the bending machine and die owned by the supplier or the machining know-how originally owned by the orderer can be referred to from the supplier's database 31. Consequently, the solid view (d) and the bending program (e), which are imparted with bending attributes, are prepared.

As illustrated in FIG. 10, the bending order and the die for use in each bending can be determined in such a manner that the determination is started from the product shape (a), the die to be used in each of the processes (b to e) is selected while being put onto the product, and the shape is being developed to a state before the machining (inverse simulation system). In each of the selection processes (b to e) for the die to be used, a die causing interference can be deleted (determined to be NG) with reference to the supplier's database 31, and appropriate dies can be selected. For example, when machining a box-shaped object as in FIG. 11, there is a risk that a used die will not be drawn out after the bending, and therefore, a die with ears is selected for use. Consequently, as illustrated in FIG. 10(f), information on the die, which is owned by the supplier and to be used in each bending process, and on the machining is provided.

From the development view data, the outsourcing service center 14 automatically prepares a NC machining program usable in the NC turret punch press and NC laser machining machine, which are owned by the supplier 12. Then, the outsourcing service center 14 can perform the machining simulation by the prepared NC machining program and can acquire simulation data thereof. The machining simulation data is prepared as data of a screen capture video representing the work contents.

FIGS. 12 and 14 illustrate details of the preparation of the NC machining program and of the preparation of the machining simulation data. As shown in the drawings, the preparation of the NC machining program is made by the supplier-specific information (FIG. 12) and by the succession of the supplier's know-how (FIG. 14). In the simulation by the supplier-specific information, information on each post-processor owned by the supplier is acquired from the supplier's database 31 based on the development view information, and the machining simulation for each post-processor (NCT machining and laser machining in the example of FIG. 12) is executed. In this case, for example as illustrated in FIG. 13 for the NCT machining, a machining method is different depending on the die owned by each supplier and the machining range of the machining machine, and there is a machining method specific to the supplier. Therefore, based on information on these, a simulation faithful to actual machining in each supplier can be executed. For example if a die for a long circle is not owned when necessary, one square punch and two circle punches will be necessary (FIG. 13(1)). Moreover, if machining for a range exceeding the machining range of the owned machining machine is required, then it will be necessary to reorganize the machine (FIG. 13(2)). Moreover, because there is a machining method specific to the supplier in the trimming order and the like, a method fit to these is designated (FIG. 13(3)).

In the program preparation by the succession of the supplier's know-how, as illustrated in FIG. 14, information (product size, bending number, bending shape and bending angle) on products associated with or similar to the development view information is acquired from the database of the supplier. Consequently, the machining know-how owned by the supplier is grasped, such as a bending method, a bending order, a bending elongation value, punch (point angle, point radius and the like), a die (V width) and front/rear attachment of the die, and thus the bending program is prepared.

As illustrated in FIG. 15, the outsourcing service center 14 can also prepare a nesting program for blanking from the development view data. For example, in the case of the NCT machining, information on the owned NCT machine, die, turret layout, NCT machining condition or machining know-how is acquired from the supplier's database, and the nesting program is prepared. In this case, for example as illustrated in FIG. 16, a program course can be selected depending on whether (i) priority is given to the yield improvement or (ii) priority is given to work efficiency in the post-process. When the priority is given to the yield improvement, the effective utilization of the material (on cost) is achieved, and however, waiting is apt to occur in the post-process. Meanwhile, when the priority is given to the work efficiency in the post-process, the post-process flows smoothly and the work efficiency is improved though the material may sometimes be wasted.

Data such as the development view data, the solid view data, the NC machining program, the machining simulation data and the screen capture video (with a vocal explanation) representing the work contents, which have been prepared in the outsourcing service center 14, are transmitted to the supplier 12 (S19). Hence, even if the supplier 12 does not have knowledge of handling the highly functional automatic programming tool, the supplier 12 can utilize the functions inherent in the tool, thus making it possible to shorten the work time and perform appropriate and efficient placement and receipt of orders (estimation preparation service).

Outsourcing Service System 2

FIG. 17 illustrates another embodiment of the service system including the outsourcing service apparatus regarding the electronic drawing data according to the present invention.

Also in this service, the electronic drawing data Dx is transmitted from the orderer 11 to the supplier 12 (S101). The outsourcing service center 14 receives the electronic drawing data Dx transferred from the supplier 12 (S104), receives therefrom the data of the database 31 of the information on the machining and tool owned by the supplier 12 (S103), and acquires the data into the database 32 in the center.

Similarly to the case during the foregoing service, the outsourcing service center 14 performs the dust removal process (S105), imparts the hole attributes (S106), prepares the development view data (S107), and prepares the solid view data (S108) based on the received electronic drawing data Dx and database information. Then, the outsourcing service center 14 estimates a trimming process time, bending shape and the number thereof and a machining process based on the development view data, and carries out basic calculations for estimations of a material cost, a machining cost, a set-up cost and the like (S109). FIG. 18 illustrates details of the basic calculations for estimations and the like. Note that, when it is determined that the supplier 12 does not own a part of the dies necessary for the machining, the cost of the die can also be estimated as illustrated in FIG. 19. Thus, it is made possible to prevent the lack of the estimation for the die and to shorten a manufacturing lead time for the die.

The outsourcing service center 14 transmits the prepared basic estimation data to the supplier 12 together with the solid view data (S110). The supplier 12 corrects the basic estimation data from the outsourcing service center 14 according to needs (S111), and transmits the corrected data to the orderer 11 together with the solid view data (S112). Thus, the supplier 12 can save the time and effort of preparing the estimation data and the like, and it is made possible to shorten the work time and to perform the appropriate and efficient placement and receipt of orders. FIG. 20 shows a table representing the overall outline of the estimation outsourcing described with reference to FIG. 18 and the like.

Outsourcing Service System 3

According to the present invention, as illustrated in FIG. 21, an outsourcing service that performs data preparation of a solid model, in which the supplier can be differentiated as a supplier, can be performed. FIG. 22 illustrates another example of the data conversion service in this service described with reference to FIG. 5 and the like. FIG. 23 illustrates an example of offered menus in the outsourcing of the development view preparation and program preparation, which have been described with reference to FIG. 6 and the like. FIG. 24 illustrates a service offering a screen capture video to be sent to the supplier 12 together with fruits by the outsourcing (with reference also to FIG. 6). The offer of the image capture video offers one obtained by capturing a screen of the work process and recording the captured screen as video data. Thus, a computer screen is shared at a real time by real time collaboration and the like, and the outsourcing provider 19 and the supplier 12 hold a meeting to make a question and a confirmation at any time, whereby precision of the outsourcing contents can be improved. Moreover, the screen capture video is reproduced to verify the outsourcing contents as well as the fruits, thus making it possible to confirm the contents of a process for generating the outsourcing fruits (to check the fruits).

Method for Providing Optimum Machining Equipment

FIG. 25 schematically illustrates a method for proposing the optimum machining equipment (including optimum machining software) as another aspect of the invention of this application.

As illustrated in FIG. 25, the electronic drawing 901 for manufacturing a predetermined product is sent as order-placement data from the customer (orderer) 11 of the client (supplier) 12 through a communication line such as the Internet to the client 12. Here, the electronic drawing 901 is, for example, a three view (front view, plan view and side view) of the sheet metal product (or part) as shown in the dotted line of FIG. 25.

Upon receiving the electronic drawing, the client 12 transfers the electronic drawing data 901 to the outsourcing service center 14 in accordance with the already described procedure.

Upon receiving the electronic drawing 901, the outsourcing service center 14 refers to the machining equipment (machining machine and die) of the client 12, the computer software for controlling the machining equipment, the computer software for controlling the machining assistance apparatus such as a CAD and a CAM when using the machining equipment and the like. Then, the outsourcing service center 14 prepares the development view 903 of the sheet metal product specified by the electronic drawing 901 based thereon.

In the preparation process of the development view 903, the outsourcing service center 14 checks the machining equipment (existing machining equipment) of the client 12, and evaluates various subjects or problems 905 when manufacturing the sheet metal product specified by the three view 901 or the development view 903 (for example, machinability, machining quality, a machining time and a set-up time).

Then, the outsourcing service center 14 selects the optimum machining equipment for manufacturing the product specified by the drawing 901 or 903 (for example, sheet metal machining machine and die thereof) based on the evaluation of the various subjects 905. This optimum machining equipment 907 includes the optimum turret punch press (NCT) 909, the laser machining machine 911 and the bending machine 913. Moreover, based on the evaluation of the subjects 905, the outsourcing service center 14 selects the optimum computer software 915 for manufacturing the sheet metal product defined by the drawing 901 or 903 or useful when manufacturing the sheet metal product.

Moreover, the outsourcing service center 14 prepares the sales proposal 917 for the client 12 based on the evaluation of the subjects 905 and the selection of the optimum machining equipment 907 or the optimum computer software 915. This sales proposal 917 includes the following data or information.

Specifically, the data includes the data 919 for analyzing the present circumstances of the existing equipment or system of the client 12, the data 921 specifying the optimum machining equipment or computer software for manufacturing the product specified by the drawing 901 or 903, and the data 923 of the introduction effect on the cost reduction and the like, which is obtained by introducing the optimum machining equipment or computer software.

More specifically, the data or information 919 of the present circumstances includes the designing time 919a and the manufacturing time 919b while manufacturing the sheet metal product specified by the drawing 901 or 903. Moreover, the data 921 of the optimum machining equipment and computer software includes the designing time 921a and the manufacturing time 921b, which are taken by using the optimum machining equipment or computer software. The data 923 of the introduction effect or the cost includes the introduction cost 923a when introducing the novel machining equipment 907 or the novel computer software 915, the time or monetary amount 923b reduced by introducing the optimum machining equipment or computer software, and the increased profit 923c obtained by the introduction. Thus, while a ready-made proposal of the customer has been obeyed heretofore, sales contents suitable for the machining mode and machining method of the client can be proposed according to the present invention.

More specifically, the method for proposing an optimum machining equipment in this embodiment is as follows. FIG. 26 explains a process for proposing an optimum machining machine when manufacturing the sheet metal product (or sheet metal part) corresponding to the drawing 901 or 903 as client-specific information based on the data thereof.

As illustrated in FIG. 26, the drawing data 901 or 903 is acquired in Step S600. In Step S601, the group of the existing client equipment information 925a such as owned machine information on the turret punch press (NCT) (for example, type of the turret punch press), owned die information, which are to be used by the client 12, turret layout information, a registered NCT machining condition, machining know-how of the supplier is acquired from the client database (SDD) 925.

In Step S602, the machining simulation for manufacturing the sheet metal part illustrated in the development view 903 by the turret punch press is carried out based on the development view 903 and the acquired various client's own equipment information 925a. More specifically, for example, in order to manufacture the part illustrated in the development view 903 by stamping, a die is allocated to the visible outlines 903a, 903b and the like of the part 903, and a die for stamping the holes 903c is allocated thereto.

In Step S603, the various subjects 905 when stamping the part 903 by the punch press are checked based on the above-described machining simulation. The subjects 905 include the machinability 905a, the machining quality 905b, the machining time 905c, and the set-up time 905d. More specifically, as illustrated in FIG. 27, the various subjects 905 include the subject on the corner radius 927, the subject on the non-circular hole 929, and the subject on the various holes 931. Specifically, in the case of the NCT, there is a problem that (a) the NCT cannot cut out the corner R into a smooth curved surface though it can perform the stamping for the corner R by a right angle punch. For (b) the non-circular hole, there are problems that the NCT cannot cut out the hole into a smooth curved surface though it can perform the stamping therefor by a circular punch and that a smooth machining will be enabled if a special shape die is ordered, but it will take cost and a lead time. Moreover, for (c) the various holes, there is a problem that a machining cannot be performed therefor when a type of a die other than the die (58, 40 or the like) storable in the turret of the NCT is necessary.

In Step S604, the feature of the client's work is examined.

In Step S605, the optimum machining machine 933 for solving the subjects 905 is selected. For example, this optimum machining machine is the laser/punch press compound machine 933 in which the function of the turret punch press and the function of the laser machining machine are accommodated in one frame. By means of this compound machine 933, the machining for the corner R 927, the non-circular hole 929 or the various holes 931 can be executed easily by the laser machining function. Moreover, a machining for other normal shape portions can be executed at a high speed by the die of the turret punch press.

In Step S606, the machining simulation in the case of machining the work 903 by the compound machine 933 is executed.

In Step S607, the proposal 917 for proposing the optimum machining machine such as the compound machine is prepared based on the process (Steps S601 to S606).

In accordance with the constitution of this embodiment, the optimum metal sheet machining machine for manufacturing the product or part of which order has been placed from the customer 11, that is, a sheet metal machine capable of reducing the cost to the maximum and performing the machining rapidly can be proposed to the client effectively.

FIG. 28 illustrates a method for proposing the optimum bending die as the optimum die for manufacturing a product corresponding to the drawing 901 or 903 based on the information (or data) thereof as the client-specific information. Here, the solid view 933 is previously prepared based on the development view 903.

In Step S700, the cross-sectional shape 935 of the product is displayed based on the solid view 933.

In Step S701, the die data 937 of the client's own die as a die that has a possibility of being fit is acquired from the client database 935, and it is checked whether or not the bending line 935a of the cross-sectional shape 935 can be bent by the die. For example, if the bending line 935a cannot be bent by the owned die 937 (for example, if large interference occurs by use of the die), then the process proceeds to Step S702. If there is no interference, then the process can also proceed to Step S704.

In Step S702, the standard die/special die data 941 of the die owned or prepared normally by the Amada's outsourcing center 14 is taken out as data of the die having the possibility of being fit from the Amada's database 939, and it is checked whether or not the bending line 935a of the cross-sectional shape 935 can be bent by this standard die/special die 941. If there is no interference in this case, then the process can also proceed to Step S704. If there is still interference though the amount thereof is reduced, then the process proceeds to Step S703.

In Step S703, a special shape die for bending the bending line 935a of the cross-sectional shape 935 is newly designed. This design includes a shape design for determining the shape and a pressure resistant design for determining a resistant pressure.

In Step S704, the proposal of the optimum die for bending the above-described product or part 933 is prepared based on the processes S701, S702 and S703. This proposal includes the description 943a that large interference occurs when using the client's own die, the description 943b that interference still occurs though the amount thereof becomes slight when using the Amada's standard die or special die, and the description 943c that no interference occurs when using the die in accordance with the Amada's special specification. The description 943b for the Amada's standard die/special die and the description 943c for the die in accordance with the Amada's special specification includes prices of the respective special dies.

FIG. 29 illustrates a method for proposing assistance computer software useful for manufacturing a product corresponding to the development view 945, the solid view 947, and the front view 949 and the cross-sectional view 951, both of which are based on the solid view 947, based on these drawings as the client-specific information.

As understood from the front view 949, the cross-sectional view 951 or the solid view 947, for this sheet metal product, it is not easy to prepare the development view 945 from the front view 949 and the cross-sectional view 951. More specifically, it is not easy to calculate the length L of the side 945b of the development view 945 or to calculate the shape of the non-circular holes 945a based on the front view 949 and the cross-sectional view 951. Note that, as understood from the front view 949, the non-circular holes 945a are the ones becoming the circles 949a when viewed from the front after the sheet metal is bent to the shape shown in the cross-sectional view 951.

In Step S801, the development view 945 for realizing the front view 949 and the cross-sectional view 951 is prepared by use of the client's own software 953.

In Step S802, the problems or subjects 955 such as a development time and development quality when preparing the development view 945 are evaluated. As described above, because it is difficult to calculate the development length L and to deduce the shape of the non-circular holes 945a, it is evaluated that an accurate drawing cannot be obtained as a result of elongation of the development time and deterioration of the development quality.

In Step S803, the development view 945 is prepared based on the front view 949 and the cross-sectional view 951 by use of the optimum computer software 951 owned by the Amada's outsourcing center 14. In this case, a development time and development quality when using this optimum computer software 951 are evaluated.

In Step S804, the introduction effect 923 on the cost reduction and the like are calculated based on the subjects 955 and the development time or the development quality evaluated in Step S802, and the proposal 917 including this calculation result is prepared.

The proposals described above, that is, the proposals prepared in Step S607 of FIG. 26, Step S704 of FIG. 28 and Step S804 of FIG. 29 are sent together with the development views 903 and 945 or the solid views 933 and 947, which are prepared based on the electronic drawing 901, through the Internet to the client 12.

Hence, the client 12 can easily know the machining machine (sheet metal machining machine), the die and the computer software for manufacturing the product ordered from the customer 11 rapidly at a low price by referring to the foregoing proposals.

What is claimed is:

1. A service apparatus for processing electronic drawing data, said service apparatus comprising:
 a receiver that receives electronic drawing data over a communications network from a requestor, the electronic drawing data being used for machining an object depicted in a drawing;
 a converter that converts the received electronic drawing data into a format designated by a supplier, and
 a transmitter that transmits the converted electronic drawing data over the communications network to a destination designated by the supplier.

2. The service apparatus according to claim 1, wherein the format designated by the supplier is a standard CAD data format in accordance with one of a DXF specification and an IGES specification.

3. The service apparatus of claim 1, wherein the converted electronic drawing data comprises data from which information, unnecessary for machining performed by the supplier, is extracted and deleted.

4. The service apparatus of claim 1, wherein the converted electronic drawing data comprises a development view.

5. The service apparatus of claim 1, wherein the converted electronic drawing data comprises a prospective solid view after bending.

6. The service apparatus of claim 1, wherein the converted electronic drawing data comprises a machining program for a numerical control device.

7. The service apparatus of claims 1, wherein the converted electronic drawing data comprises video data of a machining simulation.

8. The service apparatus of claims 1, wherein the converted electronic drawing data indicates a selected optimum machining equipment and tool.

9. The service apparatus of claim 1, wherein the converted electronic drawing data indicates a selected software application.

10. An order placement server for processing electronic drawing data, said server comprising:
    a transmitter that transmits, to a client over a communications network, identification information of at least one requestor and identification information of at least one electronic drawing data prepared by the requestor, the client displaying a format and the identification information of the electronic drawing data and the identification information of the requestor;
    a receiver that receives, from the client over the communications network, the identification information of the at least one requestor and of the at least one electronic drawing data and a designated destination for electronic drawing data that is to be converted to a predetermined format by said server, and
    a converter that converts the electronic drawing data to the predetermined format, said transmitter transmitting the converted electronic drawing data to the designated destination over the communications networks,
    wherein the electronic drawing data is used for machining an object depicted in a drawing.

11. The system according to claim 10, wherein the electronic drawing data prepared by the requestor is received by the server over the communications network.

12. An order placement client for placing orders for electronic drawing data, said client comprising:
    a receiver that receives, from a server over a communications network, identifying information of at least one requestor and identification information and format information of at least one electronic drawing data prepared by the requestor, the electronic drawing data being used for machining an object depicted in a drawing;
    a display that displays the identifying information of the at least one requestor and identification information and format information of the at least one electronic drawing data prepared by the requestor, and
    a transmitter that transmits, to the server over the communications network, identification information of electronic drawing data that is designated to be converted to a predetermined format by the server and identification information of a designated destination to which the electronic drawing data converted to the predetermined format is to be transferred, the electronic drawing data being converted to the predetermined format based on the identification information transmitted by the client over the communications network.

13. An electronic drawing data conversion method, comprising:
    receiving, from a first client over a communications network, identification information of the first client, CAD data and CAD data identification information including a CAD data format, the CAD data being used for machining an object depicted in a drawing;
    transmitting, to a second client over the communications network, the identification information of the first client and the CAD data identification information, the information being displayed by the second client on a display device;
    receiving, from the second client over the communications network, CAD data conversion request information including CAD data conversion identification information designating a CAD data conversion format;
    converting the CAD data into the format specified by the CAD data conversion identification information; and
    transmitting, to a predetermined third client over the communications network, the converted CAD data.

14. The method according to claim 13, wherein the information received from the second client over the communications network includes identification information of the third client.

15. The method according to claim 14, wherein the converted CAD data received by the predetermined third client over the communications network is used to manufacture a product.

16. The method according to claim 14, wherein the CAD data identification information and a name of a product are displayed as CAD data file information by the second client.

17. An electronic drawing data conversion method, comprising:
    receiving, from a server over a communications network, identification information of a first client and CAD data identification information including CAD format identification information, and displaying on a display device the identification information of the first client and the CAD data identification information; and
    transmitting, to the server over the communications network, CAD data conversion request information including identification information designating a conversion format to which CAD data is to be converted, the CAD data being used for machining an object depicted in a drawing.

18. The method according to claim 17, wherein the server transmits converted CAD data to a second client and a product is manufactured based on the converted CAD data.

* * * * *

UNITED STATES PATENT AND TRADEMARK OFFICE
CERTIFICATE OF CORRECTION

| | | |
|---|---|---|
| PATENT NO. | : 7,003,371 B2 | Page 1 of 1 |
| APPLICATION NO. | : 10/344010 | |
| DATED | : February 21, 2006 | |
| INVENTOR(S) | : K. Tsuchida et al. | |

It is certified that error appears in the above-identified patent and that said Letters Patent is hereby corrected as shown below:

At column 15, line 17 (claim 7, line 1) of the printed patent, "claims" should be --claim--.

At column 15, line 20 (claim 8, line 1) of the printed patent, "claims" should be --claim--.

Signed and Sealed this

Twenty-eighth Day of November, 2006

JON W. DUDAS
*Director of the United States Patent and Trademark Office*